US012671551B2

(12) United States Patent
Fang et al.

(10) Patent No.: US 12,671,551 B2
(45) Date of Patent: Jun. 30, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yun Fang, Dongguan (CN); Zhihua Shi, Dongguan (CN); Wenhong Chen, Dongguan (CN); Yingpei Huang, Dongguan (CN); Jiejiao Tian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 341 days.

(21) Appl. No.: 18/368,991

(22) Filed: Sep. 15, 2023

(65) Prior Publication Data

US 2024/0007250 A1     Jan. 4, 2024

Related U.S. Application Data

(63) Continuation     of     application     No. PCT/CN2021/081646, filed on Mar. 18, 2021.

(51) Int. Cl.
*H04L 5/00*          (2006.01)
*H04W 72/232*          (2023.01)

(52) U.S. Cl.
CPC .......... *H04L 5/0051* (2013.01); *H04L 5/0035* (2013.01); *H04W 72/232* (2023.01)

(58) Field of Classification Search
None
See application file for complete search history.

(56) References Cited

U.S. PATENT DOCUMENTS 12,581,504 B2 *   3/2026   Deghel .............. H04W 72/232
2019/0103949 A1   4/2019   Harrison
(Continued)

FOREIGN PATENT DOCUMENTS

CN         110535614 A     12/2019
CN         110771071 A      2/2020
(Continued)

OTHER PUBLICATIONS

International Search Report issued in international application No. PCT/CN2021/081646, mailed Oct. 26, 2021.
(Continued)

*Primary Examiner* — Duc T Duong
(74) *Attorney, Agent, or Firm* — BAYES PLLC

(57) ABSTRACT

A wireless communication method is applied to a terminal device configured with two sounding reference signal (SRS) resource sets, and includes: receiving downlink control information (DCI), wherein the DCI includes first indication information; and performing, according to the first indication information, a single-transmission receive point (TRP) uplink transmission or multi-TRP uplink repeated transmissions; wherein the first indication information indicates one SRS resource set in the two SRS resource sets, thereby indicating to perform the single-TRP uplink transmission through an SRS resource in the one SRS resource set; or the first indication information indicates the two SRS resource sets, thereby indicating to perform the multi-TRP uplink repeated transmissions through SRS resources in the two SRS resource sets.

18 Claims, 6 Drawing Sheets

(56) References Cited

U.S. PATENT DOCUMENTS

| | | | | |
|---|---|---|---|---|
| 2021/0037478 | A1* | 2/2021 | Yang | H04W 52/247 |
| 2021/0227474 | A1* | 7/2021 | Khoshnevisan | H04W 52/146 |
| 2022/0014328 | A1* | 1/2022 | Sakhnini | H04W 56/0045 |
| 2022/0132543 | A1* | 4/2022 | Bai | H04W 72/044 |
| 2023/0076139 | A1* | 3/2023 | Muruganathan | H04W 16/28 |
| 2023/0147122 | A1* | 5/2023 | Canonne-Velasquez | |
| | | | | H04L 5/005 |
| | | | | 370/329 |
| 2023/0353318 | A1* | 11/2023 | Khoshnevisan | H04L 5/0051 |
| 2024/0057112 | A1* | 2/2024 | Deghel | H04L 5/0035 |
| 2024/0323976 | A1* | 9/2024 | Gao | H04L 5/0035 |
| 2024/0397451 | A1* | 11/2024 | Gao | H04W 52/04 |

FOREIGN PATENT DOCUMENTS

| | | |
|---|---|---|
| CN | 110838903 A | 2/2025 |
| WO | 2020093362 A1 | 5/2020 |
| WO | 2020121528 A1 | 6/2020 |
| WO | 2021043008 A1 | 3/2021 |

OTHER PUBLICATIONS

Written Opinion of the International Searching Authority issued in international application No. PCT/CN2021/081646, mailed Oct. 26, 2021.
"3rd Generation Partnership Project; Technical Specification Group Radio Access Network; NR; Multiplexing and channel coding (Release 16)", 3GPP TS 38.212 V16.4.0 (Dec. 2020).
"Enhancements on Multi-TRP for PDCCH, PUCCH and PUSCH", Agenda item: 8.1.2.1, Source: Qualcomm Incorporated, 3GPP TSG-RAN WG1 Meeting #104-e, R1-2101447, e-Meeting, Jan. 25-Feb. 5, 2021.
"Further details on Multi-beam and Multi-TRP operation", Source: ZTE, Agenda Item: 8.1.5, 3GPP TSG RAN WG1 Meeting #103-e, R1-2007770, e-Meeting, Oct. 26-Nov. 13, 2020.
"Enhancements on Multi-beam Operation", Source: ZTE, Agenda Item: 8.1.1, 3GPP TSG RAN WG1 Meeting #103-e, R1-2007763, e-Meeting, Oct. 26-Nov. 13, 2020.
"Enhancements on Multi-TRP for PDCCH, PUCCH and PUSCH", Source: vivo, Agenda Item: 8.1.2.1, 3GPP TSG RAN WG1 #104-e, R1-2100422, e-Meeting, Jan. 25-Feb. 5, 2021.
"On PDCCH, PUCCH and PUSCH enhancements", Source: Ericsson, Agenda Item: 8.1.2.1, 3GPP TSG RAN WG 1 Meeting 10 4e, R1 2101654, Jan. 26-Feb. 12, 2021.
Second Office Action issued in corresponding Chinese Application No. 202311508680.3, mailed on Jan. 4, 2025, 16 pages.
Notice of priority examination of patent application issued in corresponding Chinese Application No. 202311508680.3, dated Oct. 23, 2024, 9 pages.
First Office Opinion Notice issued in corresponding hinese Application No. 202311508680.3, dated Nov. 1, 2024, 14 pages.
Communication pursuant to Article 94(3) EPC issued in corresponding European Application No. 21930852.5, dated Nov. 22, 2024, 7 pages.
Extended European Search Report issued in corresponding European application No. 21930852.5, mailed Mar. 14, 2024.
Source: Huawei, HiSilicon; Title: Enhancements on multi-TRP for reliability and robustness in Rel-17; R1-2100209 3GPP TSG RAN WG1 Meeting #104-e E-meeting, Jan. 25-Feb. 5, 2021.
Source: NEC; Title: Discussion on multi-TRP for PDCCH, PUCCH and PUSCH; R1-2100950 3GPP TSG RAN WG1 #104-e e-Meeting, Jan. 25-Feb. 5, 2021.
Decision of Rejection issued in corresponding Chinese Application No. 202311508680.3, mailed Apr. 8, 2025, 15 pages.

* cited by examiner

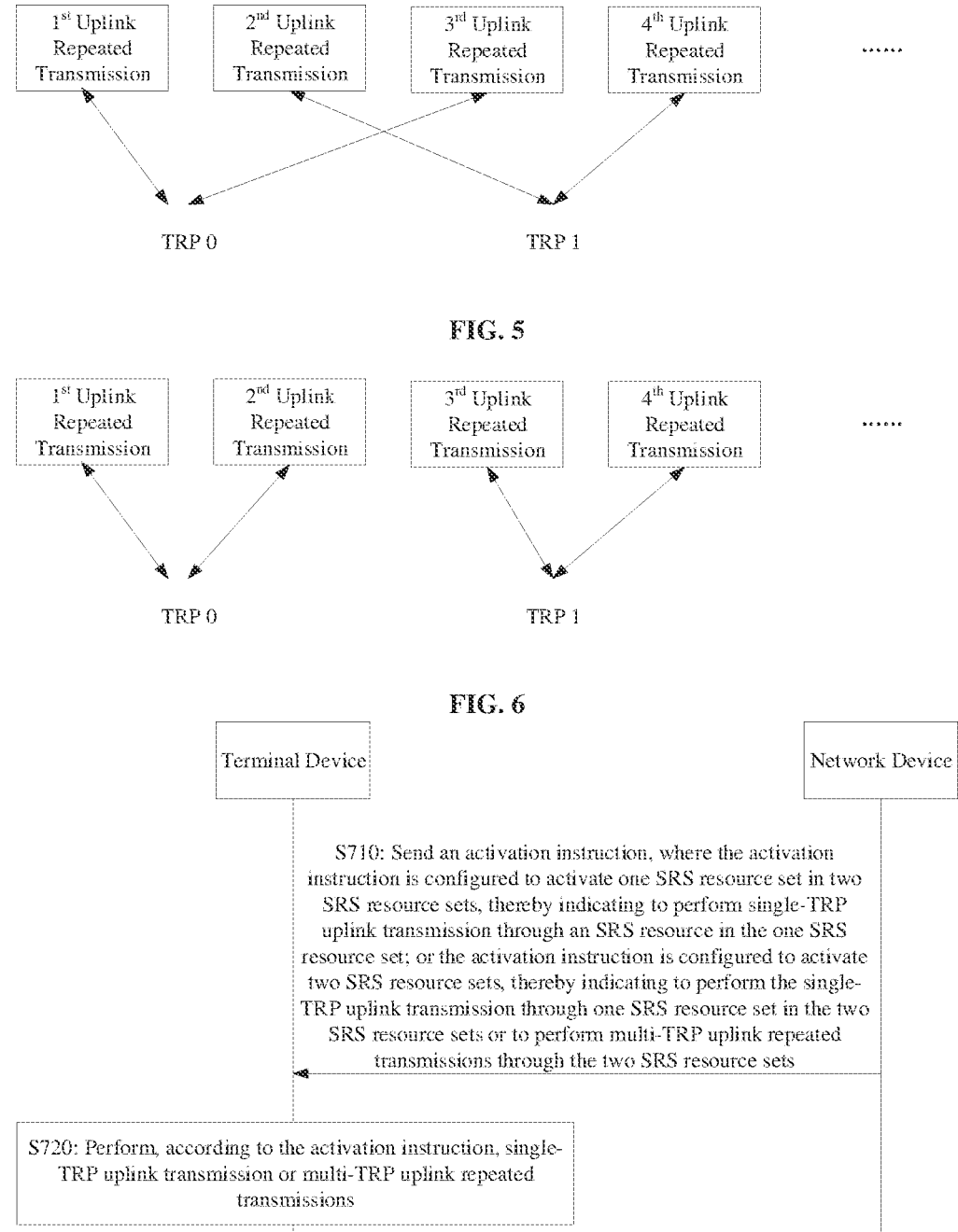

S710: Send an activation instruction, where the activation instruction is configured to activate one SRS resource set in two SRS resource sets, thereby indicating to perform single-TRP uplink transmission through an SRS resource in the one SRS resource set; or the activation instruction is configured to activate two SRS resource sets, thereby indicating to perform the single-TRP uplink transmission through one SRS resource set in the two SRS resource sets or to perform multi-TRP uplink repeated transmissions through the two SRS resource sets S720: Perform, according to the activation instruction, single-TRP uplink transmission or multi-TRP uplink repeated transmissions

FIG. 7

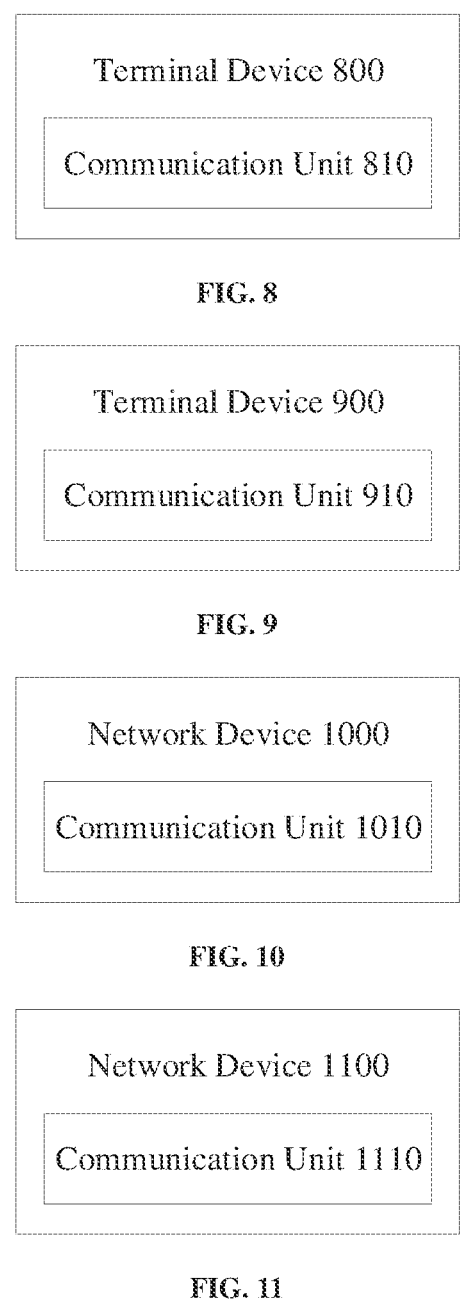

Terminal Device 800

Communication Unit 810

FIG. 8

Terminal Device 900

Communication Unit 910

FIG. 9

Network Device 1000

Communication Unit 1010

FIG. 10

Network Device 1100

Communication Unit 1110

FIG. 11

WIRELESS COMMUNICATION METHOD, TERMINAL DEVICE, AND NETWORK DEVICE

CROSS-REFERENCE TO RELATED APPLICATION

This application is a continuation of International Application No. PCT/CN2021/081646, filed Mar. 18, 2021, the contents of which are hereby incorporated by reference in its entirety.

TECHNICAL FIELD

Embodiments of this application relate to the field of communications, and more particularly, to wireless communication methods, terminal devices, and network devices.

BACKGROUND

For the non-codebook-based uplink transmission scheme, the network device may configure the terminal device with a sounding reference signal (SRS) resource set used for acquisition of uplink channel state information (CSI), where the SRS resource set includes 1 to 4 SRS resources, and each SRS resource includes 1 SRS port. For the codebook-based uplink transmission scheme, in Release (R) 16 and earlier releases, the new radio (NR) allows the network device to configure the terminal device with at most one SRS resource set used for CSI acquisition, where the SRS resource set is provided with up to two SRS resources, and the two SRS resources contain the same number of SRS antenna ports. In R16, the enhanced transmission scheme for the physical uplink shared channel (PUSCH) lies in that the PUSCH is repeatedly transmitted based on one SRS resource set used for CSI acquisition. In R17, since PUSCH enhancement based on multi-TRP (Transmission Receive Point) is introduced, starting from R17, the NR system allows the network device to configure the terminal device with a maximum of two SRS resource sets used for CSI acquisition.

In short, there are currently a single-TRP uplink transmission scheme based on one SRS resource set and a multi-TRP uplink repeated transmission scheme based on two SRS resource sets. Then, how to flexibly adopt the single-TRP uplink transmission scheme or the multi-TRP uplink repeated transmission scheme is a technical problem to be solved urgently in this application.

SUMMARY

Embodiments of this application provide wireless communication methods, terminal devices, and network devices, so as to flexibly adopt a single-TRP uplink transmission scheme or a multi-TRP uplink repeated transmission scheme.

A first aspect provides a wireless communication method, which is applied to a terminal device configured with two SRS resource sets and includes: receiving downlink control information (DCI), where the DCI includes first indication information; and performing, according to the first indication information, a single-TRP uplink transmission or multi-TRP uplink repeated transmissions; where the first indication information indicates one SRS resource set in the two SRS resource sets, thereby indicating to perform the single-TRP uplink transmission through an SRS resource in the one SRS resource set; or the first indication information indicates the two SRS resource sets, thereby indicating to perform the multi-TRP uplink repeated transmissions through SRS resources in the two SRS resource sets.

A second aspect provides a wireless communication method, which is applied to a terminal device configured with two SRS resource sets and includes: receiving an activation instruction; and performing, according to the activation instruction, a single-TRP uplink transmission or multi-TRP uplink repeated transmissions; where the activation instruction is configured to activate one SRS resource set in the two SRS resource sets, thereby indicating to perform the single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform the multi-TRP uplink repeated transmissions through the two SRS resource sets.

A third aspect provides a wireless communication method, which is applied to a terminal device configured with two SRS resource sets and includes: receiving an activation instruction; and performing, according to the activation instruction, a single-TRP uplink transmission or multi-TRP uplink repeated transmissions; where the activation instruction is configured to activate one SRS resource set in the two SRS resource sets, thereby indicating to perform the single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform the multi-TRP uplink repeated transmissions through the two SRS resource sets.

A fourth aspect provides a wireless communication method, which is applied to a network device and includes: sending an activation instruction to a terminal device, where the terminal device is configured with two SRS resource sets, and the activation instruction is configured to activate one SRS resource set in the two SRS resource sets, thereby indicating to perform a single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform multi-TRP uplink repeated transmissions through the two SRS resource sets.

A fifth aspect provides a terminal device, which is configured with two SRS resource sets and includes: a communication unit, configured to: receive DCI, where the DCI includes first indication information; and perform, according to the first indication information, a single-TRP uplink transmission or multi-TRP uplink repeated transmissions; where the first indication information indicates one SRS resource set in the two SRS resource sets, thereby indicating to perform the single-TRP uplink transmission through an SRS resource in the one SRS resource set; or the first indication information indicates the two SRS resource sets, thereby indicating to perform the multi-TRP uplink repeated transmissions through SRS resources in the two SRS resource sets.

A sixth aspect provides a terminal device, which is configured with two SRS resource sets and includes: a communication unit, configured to: receive an activation instruction; and perform single-TRP uplink transmission or multi-TRP uplink repeated transmissions according to the activation instruction; where the activation instruction is configured to activate one SRS resource set in the two SRS resource sets, thereby indicating to perform the single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform the multi-TRP uplink repeated transmissions through the two SRS resource sets.

A seventh aspect provides a network device, including: a communication unit configured to send DCI to a terminal device, where the DCI includes first indication information, and the terminal device is configured with two SRS resource sets; where the first indication information indicates one SRS resource set in the two SRS resource sets, thereby indicating to perform a single-TRP uplink transmission through an SRS resource in the one SRS resource set; or the first indication information indicates the two SRS resource sets, thereby indicating to perform multi-TRP uplink repeated transmissions through SRS resources in the two SRS resource sets.

An eighth aspect provides a network device, including: a communication unit configured to send an activation instruction to a terminal device, where the terminal device is configured with two SRS resource sets, and the activation instruction is configured to activate one SRS resource set in the two SRS resource sets, thereby indicating to perform a single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform multi-TRP uplink repeated transmissions through the two SRS resource sets.

A ninth aspect provides a terminal device, including a processor and a memory. The memory is configured to store a computer program, and the processor, through invoking and executing the computer program stored in the memory, is configured to implement the method according to the first aspect, the second aspect or various embodiments thereof.

A tenth aspect provides a network device, including a processor and a memory. The memory is configured to store a computer program, and the processor, through invoking and executing the computer program stored in the memory, is configured to implement the method according to the third aspect, the fourth aspect or various embodiments thereof.

An eleventh aspect provides an apparatus configured to implement the method according to any one of the first to fourth aspects or various embodiments thereof.

Specifically, the apparatus includes a processor configured to invoke and execute a computer program from a memory, thereby causing a device installed with the apparatus to implement the method according to any one of the first to fourth aspects or various embodiments thereof.

A twelfth aspect provides a computer-readable storage medium for storing a computer program, where the computer program causes a computer to implement the method according to any one of the first to fourth aspects or various embodiments thereof.

A thirteenth aspect provides a computer program product, including computer program instructions, where the computer program instructions cause a computer to implement the method according to any one of the first to fourth aspects or various embodiments thereof.

A fourteenth aspect provides a computer program which, when run on a computer, causes the computer to implement the method according to any one of the first to fourth aspects or various embodiments thereof.

To sum up, in this application, a new indication field is introduced into DCI, that is, the indication field where the first indication information is located, so as to indicate the SRS resource set used for the current uplink transmission, and to flexibly indicate or implicitly indicate the current uplink transmission to adopt the single-TRP uplink transmission scheme or the multi-TRP uplink repeated transmission scheme.

BRIEF DESCRIPTION OF THE DRAWINGS

FIG. 5 is a schematic diagram of beam mapping pattern 1 according to some embodiments of this application.

FIG. 6 is a schematic diagram of beam mapping pattern 2 according to some embodiments of this application.

FIG. 7 is an interaction flowchart of another wireless communication method according to some embodiments of this application.

FIG. 8 shows a schematic block diagram of a terminal device 800 according to some embodiments of this application.

FIG. 9 shows a schematic block diagram of a terminal device 900 according to some embodiments of this application.

FIG. 10 shows a schematic block diagram of a network device 1000 according to some embodiments of this application.

FIG. 11 shows a schematic block diagram of a network device 1100 according to some embodiments of this application.

DETAILED DESCRIPTION

The technical solutions in some embodiments of this application will be described below with reference to the accompanying drawings according to some embodiments of this application. Obviously, the described embodiments are part of embodiments of this application, but not all of them. Based on some embodiments in this application, all other embodiments obtained by those of ordinary skill in the art without creative efforts shall fall within the protection scope of this application.

Embodiments of this application may be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, NR system, evolution system of NR system, LTE-based access to unlicensed spectrum (LTE-U) system, NR-based access to unlicensed spectrum (NR-U) system, Universal Mobile Telecommunication System (UMTS), Wireless Local Area Network (WLAN), Wireless Fidelity (WiFi), next-generation communication system or other communication systems.

Generally speaking, traditional communication systems support a limited number of connections and are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication and the like. Embodiments of this application can also be applied to these communications systems.

Optionally, the communication system in some embodiments of this application may be applied to a Carrier Aggregation (CA) scenario, a Dual Connectivity (DC) scenario, or a Standalone (SA) networking scenario.

Some embodiments of this application do not limit the applied spectrum. For example, some embodiments of this application may be applied to the licensed spectrum, and may also be applied to the unlicensed spectrum.

Figure 1:
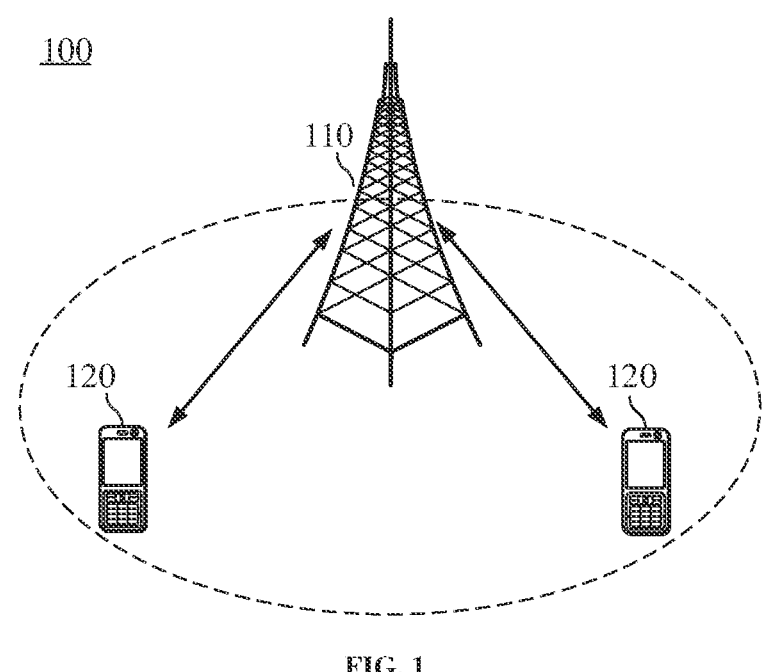
FIG. 1 is a schematic diagram of a communication system architecture according to some embodiments of this application.

Exemplarily, a communication system 100 to which some embodiments of this application are applied is shown in FIG. 1. The communication system 100 may include a network device 110, and the network device 110 may be a device that communicates with a terminal device 120 (or referred to as a communication terminal or a terminal). The network device 110 may provide communication coverage for a particular geographic area, and may communicate with terminal devices located within the coverage area.

FIG. 1 exemplarily shows one network device and two terminal devices. Optionally, the communication system 100 may include multiple network devices and the coverage of each network device may include other numbers of terminal devices. Embodiments of this application are not limited thereto.

Optionally, the communication system 100 may further include other network entities such as a network controller and a mobility management entity, which are not limited in some embodiments of this application.

It should be understood that, in some embodiments of this application, a device having a communication function in the network/system may be referred to as a communication device. Taking the communication system 100 shown in FIG. 1 as an example, the communication device may include a network device 110 and a terminal device 120 with a communication function, and the network device 110 and the terminal device 120 may be the specific devices described above, which will not be repeated here. The communication device may also include other devices in the communication system 100, such as other network entities, for example, a network controller, a mobility management entity, and the like, which are not limited in some embodiments of this application.

It should be understood that the terms "system" and "network" are often used interchangeably herein. The term "and/or" in this article is only indicative of an association relationship of the associated objects, indicating that there may be three kinds of relationships. For example, A and/or B may indicate three cases, that is, A exists alone, both A and B exist, and B exists alone. In addition, the character "/" in this document generally indicates that the related objects are in an "or" relationship.

Some embodiments of this application describe various embodiments in conjunction with terminal device and network device, where the terminal device may also be referred to as User Equipment (UE), access terminal, subscriber unit, subscriber station, mobile station, mobile site, remote station, remote terminal, mobile device, user terminal, terminal, wireless communication device, user agent, user device, or the like. The terminal device may be a station (ST) in the WLAN, or may be a cellular phone, a cordless phone, a Session Initiation Protocol (SIP) phone, a Wireless Local Loop (WLL) station, a Personal Digital Assistant (PDA) device, a handheld device with wireless communication capabilities, a computing device or other processing devices connected to wireless modems, in-vehicle devices, wearable devices, a terminal device in the next-generation communication system, such as NR network, or a terminal device in the future evolved Public Land Mobile Network (PLMN) network, or the like.

As an example without a limitation, in some embodiments of this application, the terminal device may also be a wearable device. Wearable devices may also be referred to as wearable smart devices, which are the general term for the intelligent design of daily wear and the development of wearable devices using wearable technology, such as glasses, gloves, watches, clothing and shoes. A wearable device is a portable device that is worn directly on human body or integrated into the user's clothing or accessories. Wearable device is not only a hardware device, but also realizes powerful functions through software support, data interaction, and cloud interaction. In a broad sense, wearable smart devices are of full feature and large scale, with complete or partial functions without relying on smart phones, such as smart watches or smart glasses; and, alternatively, may only focus on a certain type of application function, which needs to cooperate with other devices such as smart phones for usage, such as all kinds of smart bracelets, smart jewelry for physical sign monitoring, and the like.

The network device may be a device configured to communicate with a mobile device. The network device may be an Access Point (AP) in WLAN, a Base Transceiver Station (BTS) in GSM or CDMA, or a NodeB (NB) in WCDMA; and may also be an Evolutional Node B (eNB or eNodeB) in LTE, a relay station or an access point, a vehicle-mounted device, a wearable device, a network device or base station (gNB) in the NR network, a network device in the future evolved PLMN network, or the like.

In some embodiments of this application, the network device provides services for a cell, and the terminal device communicates with the network device through transmission resources (e.g., frequency domain resources, or spectrum resources) used by the cell, and the cell may be a cell corresponding to the network device (e.g., a base station). The cell may belong to a base station corresponding to a macro base station or a small cell, where the small cell may include a metro cell, a micro cell, a pico cell, a femto cell, and the like. These small cells have the characteristics of small coverage and low transmit power, and are suitable for providing high-speed data transmission services.

It should be understood that, in this application, the Multiple-Input Multiple-Output (MIMO) technology may be used.

Before introducing the technical solutions of this application, the following first introduces SRS, the non-codebook-based uplink transmission scheme, the codebook-based uplink transmission scheme, and a manner for indicating SRS resources in the uplink transmission scheme.

7

1. SRS

SRS may be used for CSI acquisition, downlink channel information acquisition, and uplink beam management. The NR system manages and configures the SRS in the form of SRS resource set. In some embodiments, depending on different purposes, the network device may configure multiple SRS resource sets for the terminal device, with each SRS resource set including one or more SRS resources, and each SRS resource including 1, 2 or 4 ports. The configuration information of each SRS resource set contains a usage indication, which may be configured as "beamManagement", "codebook", "nonCodebook" or "antennaswitching" respectively used for uplink beam management, codebook-based CSI acquisition, non-codebook-based CSI acquisition, and downlink channel information acquisition based on SRS antenna switching.

2. Non-Codebook-Based Uplink Transmission Scheme

Figure 2:
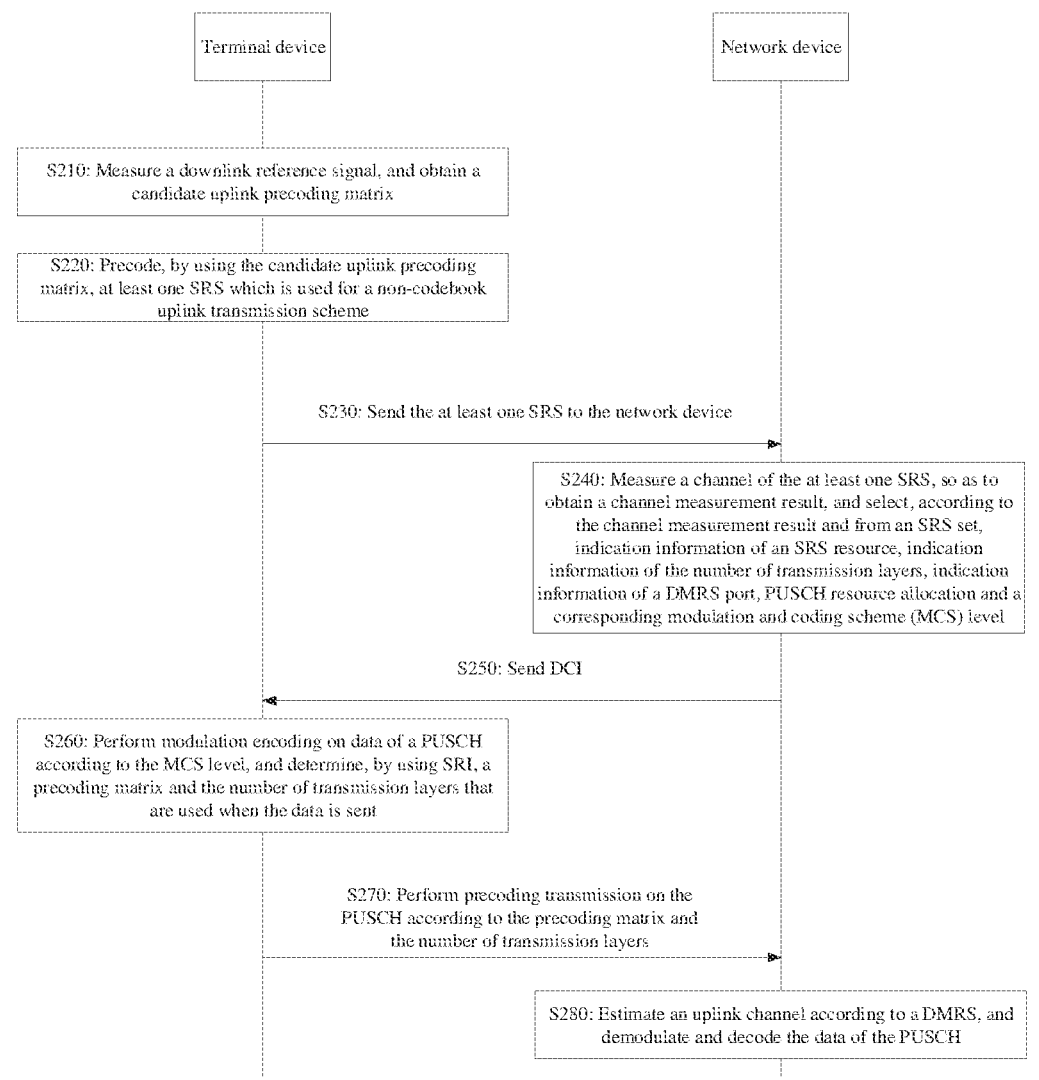
FIG. 2 is a flowchart of a non-codebook-based uplink transmission scheme.

The difference between the non-codebook-based uplink transmission scheme and the codebook-based uplink transmission scheme lies in that the precoding of the non-codebook-based uplink transmission scheme is no longer limited to the limited candidate set(s) based on the fixed codebook, and the terminal device determines the uplink precoding matrix based on channel reciprocity. If the channel reciprocity is good enough, the terminal device can obtain better uplink precoding. Compared with the codebook-based transmission scheme, the overhead of precoding indication can be saved, and better performance can be obtained at the same time. FIG. 2 is a flowchart of a non-codebook-based uplink transmission scheme. As shown in FIG. 2, the non-codebook-based uplink transmission scheme includes the following steps.

In S210, the terminal device measures a downlink reference signal to obtain a candidate uplink precoding matrix.

In S220, the terminal device pre-encodes, by using a candidate uplink precoding matrix, at least one SRS used for the non-codebook-based uplink transmission scheme.

In S230, the terminal device sends the at least one SRS to the network device.

In S240, the network device measures a channel of the at least one SRS, obtains a channel measurement result, and selects, in an SRS set according to the channel measurement result, SRS resource(s), the number of transmission layer(s), Demodulation Reference Signal (DMRS) port indication information, PUSCH resource allocation, and a corresponding Modulation and Coding Scheme (MCS) level.

In S250, the network device sends Downlink Control Information (DCI) to the terminal device.

The DCI includes SRI, DMRS port indication information, PUSCH resource allocation and the corresponding MCS level, where the SRI is used to indicate the SRS resource selected by the network device.

In S260, the terminal device modulates and encodes the data of PUSCH according to the MCS level, and determine, by using the SRI, the precoding matrix and the number of transmission layers used upon sending the data.

In S270, the terminal device performs precoding transmission on the PUSCH according to the precoding matrix and the number of transmission layers.

The DMRS of PUSCH and the data of PUSCH use the same precoding.

In S280, the network device estimates an uplink channel according to the DMRS, and performs demodulation and decoding of the data of PUSCH.

For the non-codebook-based uplink transmission scheme, the network device may configure, for the terminal device, one SRS resource set for uplink CSI acquisition, where the SRS resource set includes 1-4 SRS resources, and each SRS resource includes one SRS port. SRI may indicate one or more SRS resources selected by the network device for determining PUSCH precoding. The number of SRS resource(s) indicated by SRI is the number of transmission layers of PUSCH. In other words, the number of transmission layers of PUSCH is in one-to-one correspondence with the SRS resource(s) indicated by SRI.

For the non-codebook-based uplink transmission scheme, the terminal device may need to obtain the uplink precoding information according to the downlink reference signal based on the channel reciprocity. One terminal device may be configured with multiple downlink reference signals, where some downlink reference signals may be used for beam management, some downlink reference signals may be used for downlink CSI measurement, and some downlink reference signals may be used for downlink channel demodulation. In order for the terminal device to obtain better candidate precoding(s) for the non-codebook-based uplink transmission scheme, in the NR system, the network device is allowed to configure, for the SRS resource set used for the non-codebook-based uplink transmission scheme, an associated NZP CSI-RS resource for channel measurement. According to the associated NZP CSI-RS resource, the terminal device can obtain precoding for SRS signal transmission of the SRS resource set used for the non-codebook-based uplink transmission scheme.

3. Codebook-Based Uplink Transmission Scheme

Figure 3:
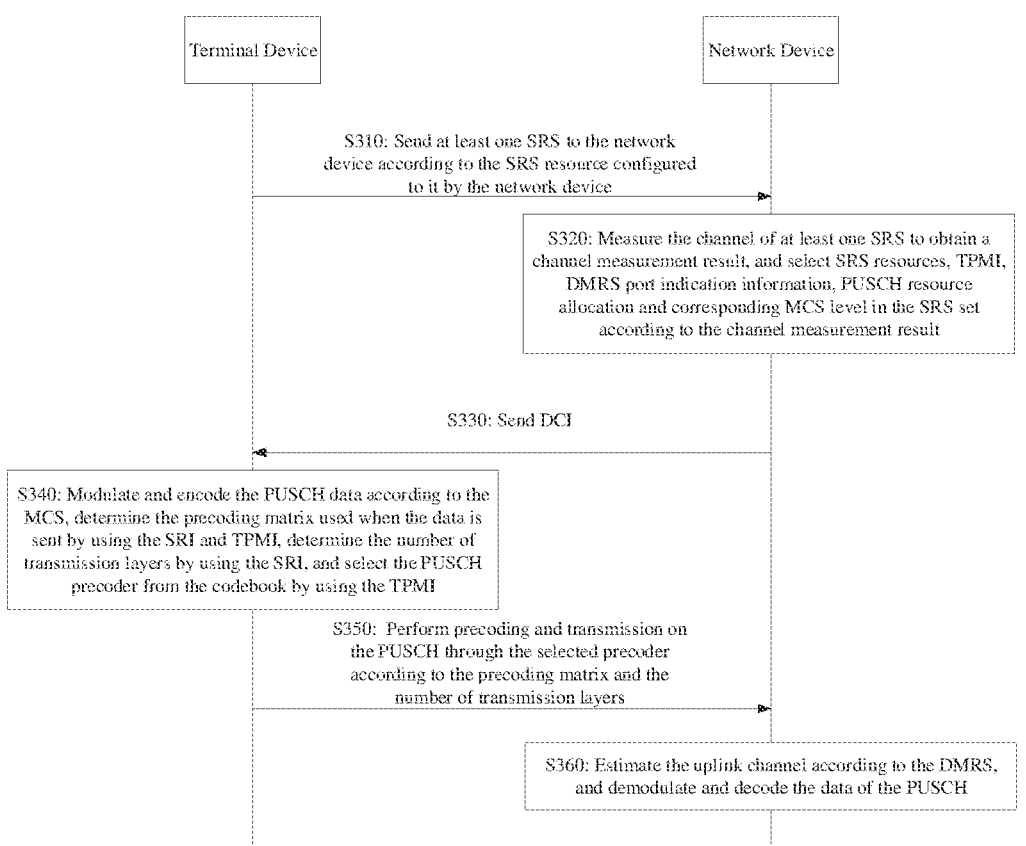
FIG. 3 is a flowchart of a codebook-based uplink transmission scheme.

FIG. 3 is a flowchart of the codebook-based uplink transmission scheme. As shown in FIG. 3, the codebook-based uplink transmission scheme in the NR system R16 includes the following steps.

In S310, the terminal device sends, according to the SRS resource configured to it by the network device, at least one SRS to the network device.

In S320, the network device measures a channel of the at least one SRS to obtain a channel measurement result, and selects, in an SRS set according to the channel measurement result, SRS resource(s), TPMI, DMRS port indication information, PUSCH resource allocation and a corresponding MCS level.

In S330, the network device sends DCI to the terminal device.

In some embodiments, the DCI includes: SRI, TPMI, DMRS port indication information, PUSCH resource allocation and the corresponding MCS level, where the SRI is used to indicate the SRS resource selected by the network device.

In S340, the terminal device modulates and encodes the PUSCH data according to the MCS, determines, by using the SRI and TPMI, the precoding matrix used upon sending the data, determines, by using the SRI, the number of transmission layers, and selects, by using the TPMI, a PUSCH precoder from the codebook.

In S350, the terminal device performs precoding and transmission on the PUSCH through the selected precoder according to the precoding matrix and the number of transmission layers.

The DMRS of PUSCH and the data of PUSCH use the same precoding.

In S360, the network device estimates an uplink channel according to the DMRS, and demodulates and decodes the data of PUSCH.

In R16 and earlier version of the NR system, the network device is allowed to configure at most one SRS resource set for the terminal device for CSI acquisition based on the codebook, and a maximum of two SRS resources, both including the same number of SRS antenna ports, may be configured in the SRS resource set. Since the enhancement of PUSCH based on multi-TRP was introduced in R17, starting from R17, the NR system allows the network device to configure a maximum of two SRS resource sets for the terminal device for CSI acquisition based on codebook. Whether the number of resources that may be included in the two resource sets are the same is not limited in R17.

The network device indicates the selected SRS resource to the terminal device through the SRI in the DCI, so as to assist the terminal device to determine the antenna and analog beamforming used for PUSCH transmission according to the SRS resource selected by the network device. Since the number of SRS resources configured by the network device for different uplink transmission schemes may be different, the SRI overhead may be reduced by determining the number of bits occupied by the SRI based on the uplink transmission scheme. Therefore, the number of bits occupied by the SRI depends on the number of SRS resource(s) configured in the uplink transmission scheme. When the network device configures only one SRS resource for an uplink transmission scheme of the terminal device, the PUSCH under the uplink transmission scheme corresponds to the SRS resource and, thus, the SRI indication field may not exist in the DCI.

4. SRI in the Codebook-Based Uplink Transmission Scheme

The downlink control channel carries the DCI sent by the network device to the terminal device, where DCI format 0_0, DCI format 0_1 and DCI format 0_2 are used to schedule the uplink PUSCH. In DCI format 0_1 and DCI format 0_2, there is an SRI indication field carrying SRI. In the non-codebook-based uplink transmission scheme, since one SRS resource corresponds to one transmission layer, the network device performs uplink channel detection based on the SRS sent by the terminal device, selects one or more SRS resources therefrom, and indicates the same to the terminal device through SRI. The SRI indication field occupies $$\left\lceil \log_2\left(\sum_{k=1}^{\min\{L_{max},N_{SRS}\}} \binom{N_{SRS}}{k}\right) \right\rceil$$

bits, where $N_{SRS}$ is the number of SRS resources in the SRS resource set configured for non-codebook transmission, and $L_{max}$ is the maximum number of layers that can be configured. In codebook transmission, since only one SRS resource is selected as the resource reference for uplink transmission, the SRI indication field occupies $[\log_2(N_{SRS})]$ bits, where $N_{SRS}$ is the number of SRS resources in the SRS resource set configured for non-codebook transmission.

As described above, there are currently a single-TRP uplink transmission scheme based on one SRS resource set and a multi-TRP uplink repeated transmission scheme based on two SRS resource sets. Accordingly, how to flexibly adopt the single-TRP uplink transmission scheme or the multi-TRP uplink repeated transmission scheme is a technical problem to be solved urgently in this application.

In addition, when the number of SRS resource(s) in the SRS resource set for uplink transmission is 1, according to the design principles of R15 and R16, there may be no SRI indication field in the DCI at this time. However, if the multi-TRP uplink repeated transmission scheme still follows the design of R15 and R16, that is, if there is no SRI indication field, the multi-TRP uplink repeated transmission(s) may be mistakenly considered as the single-TRP uplink transmission.

In order to solve this technical problem, this application introduces a new indication field in the DCI to indicate the SRS resource set used in the current uplink transmission, so as to explicitly or implicitly indicate that the current uplink transmission adopts the single-TRP uplink transmission scheme or the multi-TRP uplink transmission scheme.

The technical solution of this application will be described as follows.

Figure 4:
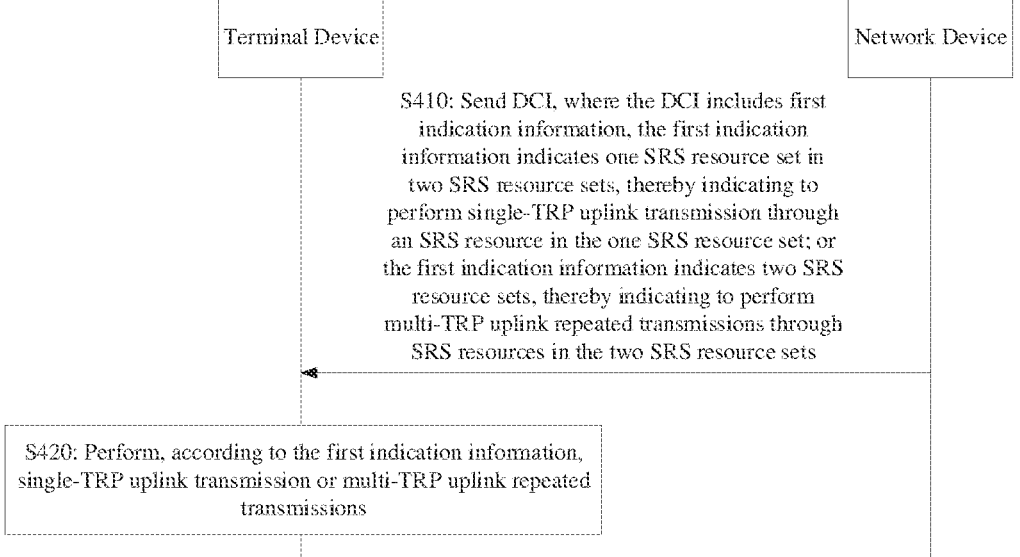
FIG. 4 is an interaction flowchart of a wireless communication method according to some embodiments of this application.

FIG. 4 is an interaction flowchart of a wireless communication method according to some embodiments of this application. The executers involved in the method include a network device and a terminal device, where the terminal device is configured with two SRS resource sets. As shown in FIG. 4. The method includes the following steps.

In S410, the network device sends DCI to the terminal device, where the DCI includes first indication information, and the first indication information indicates one SRS resource set in the two SRS resource sets, thereby indicating to perform a single-TRP uplink transmission through an SRS resource in the one SRS resource set; or the first indication information indicates the two SRS resource sets, thereby indicating to perform multi-TRP uplink repeated transmission(s) through SRS resources in the two SRS resource sets.

In S420, the terminal device performs the single-TRP uplink transmission or the multi-TRP uplink repeated transmission(s) according to the first indication information.

It should be understood that the DCI is used to schedule uplink transmission, and the uplink transmission is the single-TRP uplink transmission or the multi-TRP uplink repeated transmission(s).

It should be understood that this uplink transmission is also referred to as PUSCH transmission. Accordingly, the single-TRP uplink transmission is also referred to as single-TRP PUSCH transmission; and the multi-TRP uplink repeated transmission(s) is also referred to as PUSCH transmission.

It should be understood that the single-TRP uplink transmission may include single-TRP uplink non-repetitive transmission or single-TRP uplink repeated transmission.

Optionally, the single-TRP uplink transmission is codebook-based single-TRP uplink transmission or non-codebook-based single-TRP uplink transmission.

Optionally, the multi-TRP uplink repeated transmission is codebook-based multi-TRP uplink repeated transmission or non-codebook-based multi-TRP uplink repeated transmission.

Optionally, the multi-TRP uplink repeated transmissions occupy different time-frequency resources.

It should be understood that each SRS resource set includes at least one SRS resource, and the network device may configure the same uplink transmission mode for the above two SRS resource sets. For example, both of the two SRS resource sets correspond to codebook-based uplink transmission or non-codebook uplink transmission.

Optionally, the number of bit(s) occupied by the first indication information, or the number of bit(s) occupied by an indication field where the first indication information is located is related to the number of SRS resource set(s) configured by the network device for the terminal device. For example, the network device configures two SRS resource sets for the terminal device, so the number of bits occupied by the first indication information is 2.

Optionally, when the first indication information indicates two SRS resource sets, the two SRS resource sets have a sequential order. For example, the first indication information sequentially indicates a first SRS resource set (e.g., SRS resource set 0) and a second SRS resource set (e.g., SRS resource set 1); alternatively, the first indication information sequentially indicates the second SRS resource set (e.g., SRS resource set 1) and the first SRS resource set (e.g., SRS resource set 0). Therefore, the first indication information has four values, for example, corresponding to the four cases shown in Table 1.

TABLE 1

| First Indication Information | Corresponding Meaning |
| --- | --- |
| 0 | SRS resource set 0 and SRS resource set 1 |
| 1 | SRS resource set 1 and SRS resource set 0 |
| 2 | SRS resource set 0 |
| 3 | SRS resource set1 |

Optionally, when the first indication information indicates two SRS resource sets, the two SRS resource sets may not have a sequential order. Therefore, the first indication information has three values, for example, corresponding to the three cases shown in Table 2.

TABLE 2

| First Indication Information | Corresponding Meaning |
| --- | --- |
| 0 | SRS resource set 0 and SRS resource set 1 |
| 1 | SRS resource set 0 |
| 2 | SRS resource set1 |

To sum up, in this application, a new indication field is introduced into DCI, that is, the indication field where the first indication information is located, to indicate the SRS resource set used by the current uplink transmission, so as to flexibly explicitly or implicitly indicate that the current uplink transmission adopts either the single-TRP uplink transmission scheme or the multi-TRP uplink repeated transmission scheme.

Optionally, if the first indication information indicates two SRS resource sets, the DCI further includes an SRI indication field, and the SRI in the SRI indication field is used to indicate the selected SRS resource, where any of the following relationships is present between the SRS resource set(s) and the SRI indication field.

In the first implementation manner, if the first indication information indicates two SRS resource sets, the DCI further includes two SRI indication fields that are in one-to-one correspondence with the two SRS resource sets.

Exemplarily, assuming that the first indication information indicates SRS resource set 0 and SRS resource set 1 in sequence, then the DCI includes two SRI indication fields, which are SRI indication field 0 and SRI indication field 1 in sequence, where SRS resource set 0 corresponds to SRI indication field 0, and SRS resource set 1 corresponds to SRI indication field 1. In other words, the SRI in SRI indication field 0 is used to indicate the SRS resource selected in the SRI resource set 0, and the SRI in SRI indication field 1 is used to indicate the SRS resource selected in the SRI resource set 1.

It should be noted that, in the first implementation manner, this application does not limit the number of SRS resource(s) in the SRS resource set. In other words, no matter the number of SRS resource(s) included in the SRS resource set is one or more, the SRS resource set has the corresponding SRI indication field(s).

In the second implementation manner, if the first indication information indicates two SRS resource sets, and one SRS resource set in the two SRS resource sets includes one SRS resource, while the other SRS resource set includes multiple SRS resources, the DCI further includes one SRI Indication field corresponding to the other SRS resource set.

Exemplarily, assuming that the first indication information indicates SRS resource set 0 and SRS resource set 1 in sequence, and SRS resource set 0 includes 1 SRS resource, while SRS resource set 1 includes 2 SRS resources. Then the DCI includes 1 SRI indication filed, for example, SRI indication filed 0, where SRS resource set 1 corresponds to SRI indication field 0. In other words, the SRI in SRI indication filed 0 is used to indicate the SRS resource selected in the SRI resource set 1.

In the third implementation manner, if the first indication information indicates two SRS resource sets, and each of the two SRS resource sets includes one SRS resource, then the DCI does not include any SRI indication field.

Exemplarily, assuming that the first indication information indicates SRS resource set 0 and SRS resource set 1 in sequence, and each of SRS resource set 0 and SRS resource set 1 includes one SRS resource, then the DCI may not include any SRI indication field.

Optionally, if the first indication information indicates the two SRS resource sets, the DCI includes two SRI indication fields, and the multi-TRP uplink repeated transmission(s) is in the codebook-based uplink transmission mode, then for any one SRI indication field in the two SRI indication fields, the number of bit(s) occupied by the SRI indication field is $\max\{1, \log_2 N\}$, where N is the number of SRS resources included in the SRS resource set corresponding to the SRI indication field. Alternatively, if the first indication information indicates the two SRS resource sets, the DCI includes two SRI indication fields, and the multi-TRP uplink repeated transmission(s) is in the non-codebook-based uplink transmission mode, then for any one SRI indication field in the two SRI indication fields, the number of bit(s) occupied by the SRI indication field is $$\max\left\{1, \log_2\left(\sum_{k=1}^{min\{L_{max},N_{SRS}\}}\binom{N_{SRS}}{k}\right)\right\},$$

where $N_{SRS}$ is the number of SRS resources included in the SRS resource set corresponding to the SRI indication field, and $L_{max}$ is a maximum configurable number of layers of the SRS resources included in the SRS resource set corresponding to the SRI indication field.

As described above, when the first indication information indicates two SRS resource sets, and the DCI includes two SRI indication fields, the two SRS resource sets may or may not have a sequential order. In view of these two cases, the following will exemplarily describe the correspondence between two SRS resource sets and two SRI indication fields.

In example 1, assuming that the first indication information indicates SRS resource set 0 and SRS resource set 1 in sequence, and the DCI includes two SRI indication fields, which are SRI indication field 0 and SRI indication field 1 respectively, then SRS resource set 0 may correspond to SRI indication field 0, and SRS resource set 1 may correspond to SRI indication field 1.

In example 2, assuming that the first indication information indicates SRS resource set 1 and SRS resource set 0 in sequence, and the DCI includes two SRI indication fields, which are SRI indication field 0 and SRI indication field 1, respectively, then SRS resource set 1 may correspond to SRI indication field 0, and SRS resource set 0 may correspond to SRI indication field 1.

In example 3, assuming that the first indication information indicates SRS resource set 0 and SRS resource set 1, but there is no sequence between these two SRS resource sets, and the DCI includes two SRI indication fields, then the terminal device may adopt a default relationship between the SRS resource sets and the SRI indication fields. For example, the default relationship is that SRS resource set 0 corresponds to SRI indication field 0, and SRS resource set 1 corresponds to SRI indication field 1. Alternatively, the default relationship is that SRS resource set 1 corresponds to the SRI indication field 0, and SRS resource set 0 corresponds to SRI indication field 1.

In example 4, assuming that the first indication information indicates SRS resource set 0 and SRS resource set 1, but there is no sequence between the two SRS resource sets, and the DCI includes two SRI indication fields, then the network device may further carry second indication information in the DCI to indicate the one-to-one correspondence between the two SRS resource sets and the two SRI indication fields. For example, the one-to-one correspondence is that SRS resource set 0 corresponds to SRI indication field 0, and SRS resource set 1 corresponds to SRI indication field 1. Alternatively, the one-to-one correspondence is that SRS resource set 1 corresponds to SRI indication field 0, and SRS resource set 0 corresponds to SRI indication field 1.

Optionally, if the first indication information indicates two SRS resource sets, and the multi-TRP uplink repeated transmission(s) is in the codebook-based uplink transmission mode, then the DCI further includes two TPMI indication fields corresponding to the two SRS resource sets one by one.

As described above, when the first indication information indicates two SRS resource sets, and the DCI includes two TPMI indication fields, the two SRS resource sets may or may not have a sequential order. In view of these two cases, the following will exemplarily describe the correspondence between two SRS resource sets and two TPMI indication fields.

In example 1, assuming that the first indication information indicates SRS resource set 0 and SRS resource set 1 in sequence, and the DCI includes two TPMI indication fields, which are TPMI indication field 0 and TPMI indication field 1 respectively, then SRS resource set 0 may correspond to TPMI indication field 0, and SRS resource set 1 may correspond to TPMI indication field 1.

In example 2, assuming that the first indication information indicates SRS resource set 1 and SRS resource set 0 in sequence, and the DCI includes two TPMI indication fields, which are TPMI indication field 0 and TPMI indication field 1 in sequence, then SRS resource set 1 may correspond to TPMI indication field 0, and SRS resource set 0 may correspond to TPMI indication field 1.

In example 3, assuming that the first indication information indicates SRS resource set 0 and SRS resource set 1, but there is no sequence between the two SRS resource sets, and the DCI includes two TPMI indication fields, then the terminal device may adopt a default relationship between the SRS resource sets and the TPMI indication fields. For example, the default relationship is that the SRS resource set 0 corresponds to TPMI indication field 0, and SRS resource set 1 corresponds to TPMI indication field 1. Alternatively, the default relationship is that SRS resource set 1 corresponds to TPMI indication field 0, and SRS resource set 0 corresponds to TPMI indication field 1.

In example 4, assuming that the first indication information indicates SRS resource set 0 and SRS resource set 1, but there is no sequence between these two SRS resource sets, and the DCI includes two TPMI indication fields, then the network device may further carry third indication information in the DCI to indicate the one-to-one correspondence between the two SRS resource sets and the two TPMI indication fields. For example, the one-to-one correspondence is that SRS resource set 0 corresponds to TPMI indication field 0, and SRS resource set 1 corresponds to TPMI indication field 1. Alternatively, the one-to-one correspondence is that SRS resource set 1 corresponds to TPMI indication field 0, and SRS resource set 0 corresponds to TPMI indication field 1.

It should be understood that the above-mentioned second indication information and third indication information may be the same indication information, or may be different indication information. For example, the above-mentioned second indication information and third indication information are the same information in a single indication field in the DCI. In other words, the information can simultaneously indicate the one-to-one correspondence between the two SRS resource sets and the two SRI indication fields, as well as indicate the one-to-one correspondence between the two SRS resource sets and the two TPMI indication fields. Exemplarily, assuming that the information in the indication field is 0, it means that SRS resource set 0 corresponds to SRI indication field 0, TPMI indication field 0, and SRS resource set 1 corresponds to SRI indication field 1, TPMI indication field 1. Assuming that the value of the information in the indication field is 1, it means that SRS resource set 0 corresponds to SRI indication field 1, TPMI indication field 1, and SRS resource set 1 corresponds to SRI indication field 0, TPMI indication field 0.

As described above, when the first indication information indicates two SRS resource sets, the terminal device performs multi-TRP uplink repeated transmission(s), and the mapping relationship between the two SRS resource sets and uplink repeated transmission(s) may be any of the following manners, but not limited thereto.

In a possible implementation manner 1, if the first indication information indicates the first SRS resource set and the second SRS resource set in sequence, then the first SRS resource set may correspond to the odd-numbered uplink repeated transmission(s) in the multi-TRP uplink repeated transmissions, and the second SRS resource set may correspond to the even-numbered uplink repeated transmission(s) in multi-TRP uplink repeated transmissions.

In a possible implementation manner 2, if the first indication information indicates the second SRS resource set and the first SRS resource set in sequence, then the second SRS resource set may correspond to the odd-numbered uplink repetition transmission(s), and the first SRS resource set may correspond to the even-numbered uplink repetition transmission(s).

In a possible implementation manner 3, if the first indication information indicates two SRS resource sets, the DCI further includes fourth indication information, which is used to indicate that the first SRS resource set in the two SRS resource sets corresponds to the odd-numbered uplink repetition transmission(s) in the multi-TRP uplink repeated transmissions, and the second SRS resource set in the two SRS resource sets corresponds to the even-numbered uplink repeated transmission(s) in the multi-TRP uplink repeated transmissions.

In a possible implementation manner 4, if the first indication information indicates two SRS resource sets, the DCI further includes fifth indication information, which is used to indicate that the second SRS resource set in the two SRS resource sets corresponds to the odd-numbered uplink repetition transmission(s), and the second SRS resource set in the two SRS resource sets corresponds to the even-numbered uplink repeated transmission(s).

In a possible implementation manner 5, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. If the first indication information sequentially indicates the first SRS resource set and the second SRS resource set, then the first SRS resource set corresponds to the odd-numbered group(s) of uplink repeated transmissions in the multiple groups of M consecutive uplink repeated transmissions, and the second SRS resource set corresponds to the even-numbered group(s) of uplink repeated transmissions in the multiple groups of M consecutive uplink repeated transmissions.

In a possible implementation manner 6, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. If the first indication information indicates the second SRS resource set and the first SRS resource set in sequence, the second SRS resource set corresponds to the odd-numbered group(s) of uplink repeated transmissions, and the first SRS resource set corresponds to the even-numbered group(s) of uplink repeated transmissions.

In a possible implementation manner 7, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. If the first indication information indicates two SRS resource sets in sequence, the DCI further includes sixth indication information, which is used to indicate that the first SRS resource set in the two SRS resource sets corresponds to the odd-numbered group(s) of uplink repeated transmissions in the multiple groups of M consecutive uplink repeated transmissions, and the second SRS resource set in the two SRS resource sets corresponds to the even-numbered group(s) of uplink repeated transmissions in the multiple groups of M consecutive uplink repeated transmissions.

In a possible implementation manner 8, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. If the first indication information indicates two SRS resource sets in sequence, the DCI further includes seventh indication information, which is used to indicate that the second SRS resource set in the two SRS resource sets corresponds to the odd-numbered group(s) of uplink repeated transmissions, and the first SRS resource set in the two SRS resource sets corresponds to the even-numbered group(s) of uplink repeated transmissions.

Optionally, the uplink repeated transmission(s) in the above manner 1 to 8 may be implemented as nominal uplink repeated transmission(s) or actual uplink repeated transmission(s).

It should be understood that the multi-TRP uplink repeated transmissions include: the first(initial) uplink repeated transmission, the second uplink repeated transmission, and so on.

It should be understood that the mapping relationship between the SRS resource sets and the uplink repeated transmissions provided by the above-mentioned implementation manners 1 to 8 may also be considered as that the SRS resource sets are mapped to the uplink repeated transmissions according to the beam mapping pattern. Among them, one type of beam mapping pattern adopted in the first to fourth possible implementation manners is hereinafter referred to as the first beam mapping pattern, and another type of beam mapping pattern adopted in the fifth to eighth possible implementation manners is hereinafter referred to as the second beam mapping pattern.

The first and second beam mapping patterns are described below.

FIG. 5 is a schematic diagram of beam mapping pattern 1 according to some embodiments of this application. As shown in FIG. 5, the first uplink repeated transmission in the multi-TRP uplink repeated transmissions corresponds to TRP 0 in the multiple TRPs, the second uplink repeated transmission corresponds to TRP 1 in the multiple TRPs, the third uplink repeated transmission corresponds to TRP 0 in the multiple TRPs, the fourth uplink repeated transmission corresponds to TRP 1 in the multiple TRPs, and so on. The uplink repeated transmissions corresponding to TRP 0 may be represented by 0, and the uplink repeated transmissions corresponding to TRP 1 may be represented by 1. Assuming that there are 8 uplink repeated transmissions in total, the 8 uplink repeated transmissions may be represented by 01010101.

FIG. 6 is a schematic diagram of beam mapping pattern 2 according to some embodiments of this application. As shown in FIG. 6, the first uplink repeated transmission in the multi-TRP uplink repeated transmissions corresponds to TRP 0 in the multiple TRPs, the second uplink repeated transmission corresponds to TRP 0 in the multiple TRPs, the third uplink repeated transmission corresponds to TRP 1 in the multiple TRPs, the fourth uplink repeated transmission corresponds to TRP 1 in the multiple TRPs, and so on. The uplink repeated transmissions corresponding to TRP 0 may be represented by 0, and the uplink repeated transmissions corresponding to TRP 1 may be represented by 1. Assuming that there are 8 uplink repeated transmissions in total, the 8 uplink repeated transmissions may be represented by 00110011.

In view of above, in the possible implementation manners 1 and 3, according to the beam mapping pattern 1, the first SRS resource set corresponds to "0" in the 8 uplink repeated transmissions 01010101, and the second SRS resource set corresponds to "1" in the 8 uplink repeated transmissions 01010101. In other words, the first SRS resource set corresponds to the odd-numbered uplink repeated transmissions, and the second SRS resource set corresponds to the even-numbered uplink repeated transmissions.

In the possible implementation manners 2 and 4, according to the beam mapping pattern 1, the second SRS resource set corresponds to "0" in the 8 uplink repeated transmissions 01010101, and the first SRS resource set corresponds to "1" in 8 uplink repeated transmissions 01010101. In other words, the second SRS resource set corresponds to the odd-numbered uplink repeated transmissions, and the first SRS resource set corresponds to the even-numbered uplink repeated transmissions.

In the possible implementation manners 3 and 5, according to the beam mapping pattern 2, the first SRS resource set corresponds to "0" in the 8 uplink repeated transmissions 00110011, and the second SRS resource set corresponds to "1" in the 8 uplink repeated transmissions 00110011. In other words, the first SRS resource set corresponds to the odd-numbered uplink repeated transmissions, and the second SRS resource set corresponds to the even-numbered uplink repeated transmissions.

In the possible implementation manners 4 and 6, according to the beam mapping pattern 2, the first SRS resource set corresponds to "1" in the 8 uplink repeated transmissions 00110011, and the second SRS resource set corresponds to "0" in the 8 uplink repeated transmissions 00110011. In other words, the second SRS resource set corresponds to the odd-numbered uplink repeated transmissions, and the first SRS resource set corresponds to the even-numbered uplink repeated transmissions.

Optionally, if the first indication information indicates one SRS resource set, the DCI further includes an SRI indication field, and the SRI carried in the SRI indication field is used to indicate an SRS resource in the SRS resource set. Alternatively, if the first indication information indicates one SRS resource set, the DCI further includes two SRI indication fields, one of the two SRI indication fields carries an SRI used to indicate an SRS resource in the SRS resource set, and the other SRI indication field is not used to indicate any SRS resource. Alternatively, if the first indication information indicates one SRS resource set, and the SRS resource set includes one SRS resource, the DCI does not include any SRI indication field.

Optionally, if the first indication information indicates one SRS resource set, and the DCI includes two SRI indication fields, the first SRI indication field in the two SRI indication fields carries the SRI and is used to indicate an SRS resource set. SRS resource, the second SRI indication field is not used to indicate any SRS resource. Alternatively, the second SRI indication field in the two SRI indication fields carries SRI and is used to indicate SRS resources in one SRS resource set, and the first SRI indication field is not used to indicate any SRS resources.

In an example 1, assuming that the first indication information indicates SRS resource set 0, the DCI may include SRI indication field 0 corresponding to SRS resource set 0.

In an example 2, assuming that the first indication information indicates SRS resource set 0, the DCI may include SRI indication field 0 and SRI indication field 1, where SRI indication field 0 may correspond to SRS resource set 0, and SRI indication field 1 does not indicate any SRS resource. Alternatively, SRI indication field 1 may correspond to SRS resource set 0, while SRI indication field 0 does not indicate any SRS resource.

In an example 3, assuming that the first indication information indicates SRS resource set 0, and SRS resource set 0 does not include any SRS resource, then the DCI may not include the SRI indication field.

Optionally, if the first indication information indicates one SRS resource set, and the single-TRP uplink transmission is in the codebook-based uplink transmission mode, then the DCI further includes a TPMI indication field, which carries a TPMI corresponding to an SRS resource in the SRS resource set. Alternatively, if the first indication information indicates one SRS resource set, and the single-TRP uplink transmission is in the codebook-based uplink transmission mode, the DCI further includes two TPMI indication fields, where one of the two TPMI indication fields carries a TPMI corresponding to an SRS resource in the SRS resource set, and the other TPMI indication field does not correspond to any SRS resource.

Optionally, the first(initial) TPMI indication field in the two TPMI indication fields carries the TPMI corresponding to an SRS resource in the SRS resource set, and the second TPMI indication field does not correspond to any SRS resource.

In an example 1, assuming that the first indication information indicates SRS resource set 0, the DCI may include a TPMI indication field 0 corresponding to SRS resource set 0.

In an example 2, assuming that the first indication information indicates SRS resource set 0, the DCI may include TPMI indication field 0 and TPMI indication field 1, where TPMI indication field 0 may correspond to SRS resource set 0, while TPMI indication field 1 does not correspond to any SRS resource. Alternatively, TPMI indication field 1 may correspond to SRS resource set 0, while TPMI indication field 0 does not correspond to any SRS resource.

In view of above, this application proposes the correspondence between the SRS resource set(s) indicated by the first indication information and the SRI indication field or the TPMI indication field.

FIG. 7 is an interaction flowchart of another wireless communication method according to some embodiments of this application. The executers involved in the method includes a network device and a terminal device, where the terminal device is configured with two SRS resource sets. As shown in FIG. 7, the method includes the following steps.

In S710, the network device sends an activation instruction to the terminal device, where the activation instruction is configured to activate one SRS resource set in the two SRS resource sets, thereby indicating to perform a single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform multi-TRP uplink repeated transmission(s) through the two SRS resource sets.

In S720, the terminal device performs single-TRP uplink transmission or multi-TRP uplink repeated transmission(s) according to the activation instruction.

Optionally, the above activation instruction may be a Media Access Control (MAC) Control Element (CE), but is not limited thereto.

It should be understood that, regarding the SRS resource set, single-TRP uplink transmission, multi-TRP uplink repeated transmission(s), the correspondence between the SRS resource set(s) and the SRI indication field(s), the correspondence between the SRS resource set(s) and the TPMI indication field(s), and the like, the above description may be referred to, which will not be repeated herein this application.

Optionally, if the activation command is used to activate two SRS resource sets, there may be the following implementation manners, but this application is not limited thereto.

In a possible implementation manner 1, the terminal device uses the two SRS resource sets by default to perform multi-TRP uplink repeated transmission(s).

In a possible implementation manner 2, the network device sends indication information to the terminal device, where the indication information sequentially indicates the first SRS resource set and the second SRS resource set in the two SRS resource sets, or, sequentially indicates the second SRS resource set and the first SRS resource. Accordingly, the terminal device determines to perform multi-TRP uplink repeated transmission(s).

In a possible implementation manner 3, the network device sends indication information to the terminal device, where the indication information is used to indicate any one of the following: indicate the first SRS resource set in the two SRS resource sets; indicate the second SRS resource set of the two SRS resource sets; indicate the first SRS resource set and the second SRS resource set in sequence; and indicate the second SRS resource set and the first SRS resource set in sequence. If the indication information indicates the first SRS resource set or the second SRS resource set, the indication information is used to assist in determining to perform single-TRP uplink repeated transmission. Alternatively, if the indication information indicates the first SRS resource set and the second SRS resource set in sequence, or indicates the second SRS resource set and the first SRS resource set in sequence, the indication information is used to assist in determining to perform multi-TRP uplink repeated transmission.

Optionally, in the possible implementation manner 1, the terminal device may perform the uplink repeated transmission(s) by using a default correspondence between the SRS resource set(s) and uplink repeated transmission(s), or the terminal device may perform the uplink repeated transmission(s) according to correspondence, indicated by the network device, between the SRS resource set(s) and uplink repeated transmission(s), which is not limited in this application.

Optionally, in the possible implementation manner 2, the indication information is carried in the DCI and occupies 1 bit.

Exemplarily, Table 3 shows the meaning corresponding to each value of the indication information.

TABLE 3

| Indication Information | Corresponding Meaning |
|---|---|
| 0 | SRS resource set 0 and SRS resource set 1 |
| 1 | SRS resource set 1 and SRS resource set 0 |

Optionally, in the possible implementation manner 2, the terminal device can determine the correspondence between the SRS resource sets and the uplink repeated transmissions according to the order of the SRS resource sets indicated by the indication information, and the above-mentioned beam mapping pattern 1 or 2, so as to perform the uplink repeated transmission(s).

Optionally, in the possible implementation manner 3, the indication information is carried in the DCI and occupies 2 bits.

To sum up, in this application, the terminal device can determine whether the current uplink transmission adopts the single-TRP uplink transmission mode or the multi-TRP uplink repeated transmission mode according to the above activation instruction, or according to the activation instruction and the above indication information.

FIG. 8 shows a schematic block diagram of a terminal device 800 according to some embodiments of this application. As shown in FIG. 8, the terminal device 800 is configured with two SRS resource sets, and the terminal device 800 includes a communication unit 810 configured to: receive DCI, where the DCI includes first indication information; and perform, according to the first indication information, a single-TRP uplink transmission or multi-TRP uplink repeated transmissions. Herein, the first indication information indicates one SRS resource set in the two SRS resource sets, thereby indicating to perform the single-TRP uplink transmission through an SRS resource in the one SRS resource set; or the first indication information indicates the two SRS resource sets, thereby indicating to perform the multi-TRP uplink repeated transmissions through SRS resources in the two SRS resource sets.

Optionally, if the first indication information indicates the two SRS resource sets, the DCI further includes two SRI indication fields, and the two SRI indication fields are in one-to-one correspondence with the two SRS resource sets. Alternatively, if the first indication information indicates the two SRS resource sets, one SRS resource set in the two SRS resource sets includes one SRS resource, and another SRS resource set includes multiple SRS resources, the DCI further includes one SRI indication field, and the one SRI indication field corresponds to the another SRS resource set. Alternatively, if the first indication information indicates the two SRS resource sets, and each of the two SRS resource sets includes one SRS resource, the DCI does not include any SRI indication field.

Optionally, if the first indication information sequentially indicates a first SRS resource set and a second SRS resource set in the two SRS resource sets, and the DCI includes two SRI indication fields, the first SRS resource set corresponds to a first SRI indication field in the two SRI indication fields, and the second SRS resource set corresponds to a second SRI indication field in the two SRI indication fields. Alternatively, if the first indication information sequentially indicates the second SRS resource set and the first SRS resource set, the second SRS resource set corresponds to the first SRI indication field, and the first SRS resource set corresponds to the second SRI indication field.

Optionally, if the first indication information indicates the two SRS resource sets, and the DCI includes two SRI indication fields, the DCI further includes second indication information, and the second indication information is configured to indicate the one-to-one correspondence between the two SRS resource sets and the two SRI indication fields.

Optionally, if the first indication information indicates the two SRS resource sets, the DCI includes two SRI indication fields, and the multi-TRP uplink repeated transmissions are in the codebook-based uplink transmission mode, for any one SRI indication field in the two SRI indication fields, the number of bits occupied by the SRI indication field is $\max\{1, \log_2 N\}$, where N is the number of SRS resources included in an SRS resource set corresponding to the SRI indication field. Alternatively, if the first indication information indicates the two SRS resource sets, the DCI includes two SRI indication fields, and the multi-TRP uplink repeated transmissions are in the non-codebook-based uplink transmission mode, for any one SRI indication field in the two SRI indication fields, the number of bits occupied by the SRI indication field is $$\max\left\{1, \log_2\left(\sum_{k=1}^{\min\{L_{max}, N_{SRS}\}} \binom{N_{SRS}}{k}\right)\right\},$$

where $N_{SRS}$ is the number of SRS resources included in an SRS resource set corresponding to the SRI indication field, and $L_{max}$ is a maximum configurable number of layers of the SRS resources included in the SRS resource set corresponding to the SRI indication field.

Optionally, if the first indication information indicates the two SRS resource sets, and the multi-TRP uplink repeated transmissions are in the codebook-based uplink transmission mode, the DCI further includes two TPMI indication fields, and the two TPMI indication fields are in one-to-one correspondence with the two SRS resource sets.

Optionally, if the first indication information sequentially indicates a first SRS resource set and a second SRS resource set, the first SRS resource set corresponds to a first TPMI indication field in the two TPMI indication fields, and the second SRS resource set corresponds to a second TPMI indication field in the two TPMI indication fields. Alternatively, if the first indication information sequentially indicates the second SRS resource set and the first SRS resource set, the second SRS resource set corresponds to the first TPMI indication field, and the first SRS resource set corresponds to the second TPMI indication field.

Optionally, if the first indication information indicates the two SRS resource sets, and the DCI includes two TPMI indication fields, the DCI further includes third indication information, and the third indication information is configured to indicate the one-to-one correspondence between the two SRS resource sets and the two TPMI indication fields.

Optionally, if the first indication information sequentially indicates a first SRS resource set and a second SRS resource set, the first SRS resource set corresponds to the odd-numbered uplink repeated transmission(s) in the multi-TRP uplink repeated transmissions, and the second SRS resource set corresponds to the even-numbered uplink repeated transmission(s) in the multi-TRP uplink repeated transmissions. Alternatively, if the first indication information sequentially indicates the second SRS resource set and the first SRS resource set, the second SRS resource set corresponds to the odd-numbered uplink repeated transmission(s), and the first SRS resource set corresponds to the even-numbered uplink repeated transmission(s).

Optionally, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. if the first indication information sequentially indicates a first SRS resource set and a second SRS resource set, the first SRS resource set corresponds to the odd-numbered group of uplink repeated transmission(s) in the multiple groups of M consecutive uplink repeated transmissions, and the second SRS resource set corresponds to the even-numbered group of uplink repeated transmission(s) in the multiple groups of M consecutive uplink repeated transmissions. Alternatively, if the first indication information sequentially indicates the second SRS resource set and the first SRS resource set, the second SRS resource set corresponds to the odd-numbered group of uplink repeated transmission(s), and the first SRS resource set corresponds to the even-numbered group of uplink repeated transmission(s).

Optionally, if the first indication information indicates the two SRS resource sets, the DCI further includes fourth indication information, where the fourth indication information is configured to indicate that a first SRS resource set in the two SRS resource sets corresponds to the odd-numbered uplink repeated transmission(s) in the multi-TRP uplink repeated transmissions, and a second SRS resource set in the two SRS resource sets corresponds to the even-numbered uplink repeated transmission(s) in the multi-TRP uplink repeated transmissions. Alternatively, if the first indication information indicates the two SRS resource sets, the DCI further includes fifth indication information, where the fifth indication information is configured to indicate that the second SRS resource set in the two SRS resource sets corresponds to the odd-numbered uplink repeated transmission(s), and the first SRS resource set in the two SRS resource sets corresponds to the even-numbered uplink repeated transmission(s).

Optionally, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. if the first indication information sequentially indicates the two SRS resource sets, the DCI further includes sixth indication information, where the sixth indication information is configured to indicate that a first SRS resource set in the two SRS resource sets corresponds to the odd-numbered group of uplink repeated transmission(s) in the multiple groups of M consecutive uplink repeated transmissions, and a second SRS resource set in the two SRS resource sets corresponds to the even-numbered group of uplink repeated transmission(s) in the multiple groups of M consecutive uplink repeated transmissions. Alternatively, if the first indication information sequentially indicates the two SRS resource sets, the DCI further includes seventh indication information, where the seventh indication information is configured to indicate that the second SRS resource set in the two SRS resource sets corresponds to the odd-numbered group of uplink repeated transmission(s), and the first SRS resource set in the two SRS resource sets corresponds to the even-numbered group of uplink repeated transmission(s).

Optionally, the uplink repeated transmission(s) is a nominal uplink repeated transmission(s) or an actual uplink repeated transmission(s).

Optionally, if the first indication information indicates one SRS resource set, the DCI further includes one SRI indication field which carries an SRI used to indicate an SRS resource(s) in the SRS resource set. Alternatively, if the first indication information indicates one SRS resource set, the DCI further includes two SRI indication fields, where one of the two SRI indication fields carries an SRI used to indicate an SRS resource(s) in the SRS resource set, and the other indication field is not used to indicate any SRS resource. Alternatively, if the first indication information indicates one SRS resource set including one SRS resource, the DCI does not include any SRI indication field.

Optionally, if the first indication information indicates one SRS resource set, and the DCI includes two SRI indication fields, the first SRI indication field in the two SRI indication fields carries an SRI used to indicate an SRS resource(s) in the SRS resource set, and the second SRI indication field is not used to indicate any SRS resource.

Optionally, if the first indication information indicates one SRS resource set, and the single-TRP uplink transmission is in the codebook-based uplink transmission mode, the DCI further includes a TPMI indication field which carries a TPMI corresponding to an SRS resource(s) in the SRS resource set. Alternatively, if the first indication information indicates one SRS resource set, and the single-TRP uplink transmission is in the codebook-based uplink transmission mode, the DCI further includes two TPMI indication fields, where one of the two TPMI indication fields carries a TPMI corresponding to an SRS resource(s) in the SRS resource set, and the other TPMI indication field does not correspond to any SRS resource.

Optionally, the first TPMI indication field in the two TPMI indication fields carries the TPMI corresponding to an SRS resource(s) in the SRS resource set, and the second TPMI indication field does not correspond to any SRS resource.

Optionally, the single-TRP uplink transmission is codebook-based single-TRP uplink transmission or non-codebook-based single-TRP uplink transmission. The multi-TRP uplink repeated transmission(s) is codebook-based multi-TRP uplink repeated transmission(s) or non-codebook-based multi-TRP uplink repeated transmission(s).

Optionally, the multi-TRP uplink repeated transmissions occupy different time-frequency resources.

Optionally, in some embodiments, the above-mentioned communication unit may be a communication interface or a transceiver, or an input/output interface of a communication chip or a system-on-chip.

It should be understood that the terminal device 800 according to some embodiments of this application may correspond to the terminal device in the method embodiments corresponding to FIG. 4 of this application, and the above-mentioned and other operations and/or functions of the various units in the terminal device 800 are respectively for realizing the above-mentioned process of the terminal device in the method embodiments corresponding to FIG. 4, which are not repeated here for brevity.

FIG. 9 shows a schematic block diagram of a terminal device 900 according to some embodiments of this application. As shown in FIG. 9, the terminal device 900 is configured with two SRS resource sets, and the terminal device 900 includes a communication unit 910 configured to: receive an activation instruction; and performing, according to the activation instruction, a single-TRP uplink transmission or multi-TRP uplink repeated transmissions. Herein, the activation instruction is configured to activate one SRS resource set in the two SRS resource sets, thereby indicating to perform the single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform the multi-TRP uplink repeated transmissions through the two SRS resource sets.

Optionally, if the activation instruction is configured to activate two SRS resource sets, the communication unit 910 is further configured to: receive indication information. The indication information is configured to assist in determining whether to perform the single-TRP uplink transmission or the multi-TRP uplink repeated transmissions.

Optionally, the indication information sequentially indicates a first SRS resource set and a second SRS resource set in the two SRS resource sets, or sequentially indicates the second SRS resource set and the first SRS resource set.

Optionally, if the indication information sequentially indicates the first SRS resource set and the second SRS resource set in the two SRS resource sets, or sequentially indicates the second SRS resource set and the first SRS resource set, the indication information is configured to assist in determining to perform the multi-TRP uplink repeated transmissions.

Optionally, the indication information is carried in DCI and occupies 1 bit.

Optionally, the indication information is configured to indicate any of the following:
- indicate a first SRS resource set in the two SRS resource sets;
- indicate a second SRS resource set in the two SRS resource sets;
- sequentially indicate the first SRS resource set and the second SRS resource set;
- sequentially indicate the second SRS resource set and the first SRS resource set.

Optionally, if the indication information indicates the first SRS resource set or the second SRS resource set, the indication information is configured to assist in determining to perform the single-TRP uplink repeated transmission. Alternatively, if the indication information sequentially indicates the first SRS resource set and the second SRS resource set, or sequentially indicates the second SRS resource set and the first SRS resource set, the indication information is configured to assist in determining to perform the multi-TRP uplink repeated transmissions.

Optionally, the indication information is carried in DCI and occupies 2 bits.

Optionally, in some embodiments, the above-mentioned communication unit may be a communication interface or a transceiver, or an input/output interface of a communication chip or a system-on-chip.

It should be understood that the terminal device 900 according to some embodiments of this application may correspond to the terminal device in the method embodiments corresponding to FIG. 7 of this application, and the above-mentioned and other operations and/or functions of the various units in the terminal device 900 are configured to achieve the above-mentioned process of the terminal device in the method embodiments corresponding to FIG. 7, which are not repeated here for brevity.

FIG. 10 shows a schematic block diagram of a network device 1000 according to some embodiments of this application. As shown in FIG. 10, the network device 1000 includes a communication unit 1010 configured to: sending DCI to the terminal device, where the DCI includes first indication information, and the terminal device is configured with two SRS resource sets. Herein, the first indication information indicates one SRS resource set in the two SRS resource sets, thereby indicating to perform a single-TRP uplink transmission through an SRS resource in the one SRS resource set; or the first indication information indicates the two SRS resource sets, thereby indicating to perform multi-TRP uplink repeated transmissions through SRS resources in the two SRS resource sets.

Optionally, if the first indication information indicates the two SRS resource sets, the DCI further includes two SRI indication fields, and the two SRI indication fields are in one-to-one correspondence with the two SRS resource sets. Alternatively, if the first indication information indicates the two SRS resource sets, one SRS resource set in the two SRS resource sets includes one SRS resource, and another SRS resource set includes multiple SRS resources, the DCI further includes one SRI indication field corresponding to the another SRS resource set. Alternatively, if the first indication information indicates the two SRS resource sets, and each of the two SRS resource sets includes one SRS resource, the DCI does not comprise any SRI indication field.

Optionally, if the first indication information sequentially indicates a first SRS resource set and a second SRS resource set in the two SRS resource sets, and the DCI includes two SRI indication fields, the first SRS resource set corresponds to a first SRI indication field in the two SRI indication fields, and the second SRS resource set corresponds to a second SRI indication field in the two SRI indication fields. Alternatively, if the first indication information sequentially indicates the second SRS resource set and the first SRS resource set, the second SRS resource set corresponds to the first SRI indication field, and the first SRS resource set corresponds to the second SRI indication field.

Optionally, if the first indication information indicates the two SRS resource sets, and the DCI includes the two SRI indication fields, the DCI further includes second indication information, and the second indication information is configured to indicate the one-to-one correspondence between the two SRS resource sets and the two SRI indication fields.

Optionally, if the first indication information indicates the two SRS resource sets, the DCI includes the two SRI indication fields, and the multi-TRP uplink repeated transmissions are in the codebook-based uplink transmission mode, for any one SRI indication field in the two SRI indication fields, the number of bits occupied by the SRI indication field is $\max\{1, \log_2 N\}$, where N is a number of SRS resources includes in an SRS resource set corresponding to the SRI indication field. Alternatively, if the first indication information indicates the two SRS resource sets, the DCI includes the two SRI indication fields, and the multi-TRP uplink repeated transmissions are in the non-codebook-based uplink transmission mode, for any one SRI indication field in the two SRI indication fields, the number of bits occupied by the SRI indication field is $$\max\left\{1, \log_2\left(\sum\nolimits_{k=1}^{\min\{L_{max},N_{SRS}\}} \binom{N_{SRS}}{k}\right)\right\},$$

where $N_{SRS}$ is the number of SRS resources included in an SRS resource set corresponding to the SRI indication field, and $L_{max}$ is a maximum configurable number of layers of the SRS resources included in the SRS resource set corresponding to the SRI indication field.

Optionally, if the first indication information indicates the two SRS resource sets, and the multi-TRP uplink repeated transmissions are in the codebook-based uplink transmission mode, the DCI further includes two TPMI indication fields, and the two TPMI indication fields are in one-to-one correspondence with the two SRS resource sets.

Optionally, if the first indication information sequentially indicates a first SRS resource set and a second SRS resource set, the first SRS resource set corresponds to a first TPMI indication field in the two TPMI indication fields, and the second SRS resource set corresponds to a second TPMI indication field in the two TPMI indication fields. Alternatively, if the first indication information sequentially indicates the second SRS resource set and the first SRS resource set, the second SRS resource set corresponds to the first TPMI indication field, and the first SRS resource set corresponds to the second TPMI indication field.

Optionally, if the first indication information indicates the two SRS resource sets, and the DCI includes the two TPMI indication fields, the DCI further includes third indication information, and the third indication information is configured to indicate the one-to-one correspondence between the two SRS resource sets and the two TPMI indication fields.

Optionally, if the first indication information sequentially indicates a first SRS resource set and a second SRS resource set, the first SRS resource set corresponds to an odd-numbered uplink repeated transmission in the multi-TRP uplink repeated transmissions, and the second SRS resource set corresponds to an even-numbered uplink repeated transmission in the multi-TRP uplink repeated transmissions. Alternatively, if the first indication information sequentially indicates the second SRS resource set and the first SRS resource set, the second SRS resource set corresponds to the odd-numbered uplink repeated transmission, and the first SRS resource set corresponds to the even-numbered uplink repeated transmission.

Optionally, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. If the first indication information sequentially indicates a first SRS resource set and a second SRS resource set, the first SRS resource set corresponds to an odd-numbered group of uplink repeated transmissions in the multiple groups of M consecutive uplink repeated transmissions, and the second SRS resource set corresponds to an even-numbered group of uplink repeated transmissions in the multiple groups of M consecutive uplink repeated transmissions. Alternatively, if the first indication information sequentially indicates the second SRS resource set and the first SRS resource set, the second SRS resource set corresponds to the odd-numbered group of uplink repeated transmissions, and the first SRS resource set corresponds to the even-numbered group of uplink repeated transmissions.

Optionally, if the first indication information indicates the two SRS resource sets, the DCI further includes fourth indication information, where the fourth indication information is configured to indicate that a first SRS resource set in the two SRS resource sets corresponds to an odd-numbered uplink repeated transmission in the multi-TRP uplink repeated transmissions, and a second SRS resource set in the two SRS resource sets corresponds to an even-numbered uplink repeated transmission in the multi-TRP uplink repeated transmissions. Alternatively, if the first indication information indicates the two SRS resource sets, the DCI further includes fifth indication information, where the fifth indication information is configured to indicate that the second SRS resource set in the two SRS resource sets corresponds to the odd-numbered uplink repeated transmission, and the first SRS resource set in the two SRS resource sets corresponds to the even-numbered uplink repeated transmission.

Optionally, starting from an initial uplink repeated transmission in the multi-TRP uplink repeated transmissions, every M consecutive uplink repeated transmissions are in one group, and the multi-TRP uplink repeated transmissions include multiple groups of M consecutive uplink repeated transmissions, where M is an integer greater than 1. If the first indication information sequentially indicates the two SRS resource sets, the DCI further include sixth indication information, where the sixth indication information is configured to indicate that a first SRS resource set in the two SRS resource sets corresponds to an odd-numbered group of uplink repeated transmissions in the multiple groups of M consecutive uplink repeated transmissions, and a second SRS resource set in the two SRS resource sets corresponds to an even-numbered group of uplink repeated transmissions in the multiple groups of M consecutive uplink repeated transmissions. Alternatively, if the first indication information sequentially indicates the two SRS resource sets, the DCI further include seventh indication information, where the seventh indication information is configured to indicate that the second SRS resource set in the two SRS resource sets corresponds to the odd-numbered group of uplink repeated transmissions, and the first SRS resource set in the two SRS resource sets corresponds to the even-numbered group of uplink repeated transmissions.

Optionally, the uplink repeated transmission(s) is nominal uplink repeated transmission(s) or an actual uplink repeated transmission(s).

Optionally, if the first indication information indicates one SRS resource set, the DCI further includes one SRI indication field, and an SRI carried in the one SRI indication field is configured to indicate an SRS resource in the one SRS resource set. Alternatively, if the first indication information indicates the one SRS resource set, the DCI further includes two SRI indication fields, where an SRI indication field in the two SRI indication fields carries an SRI and is configured to indicate an SRS resource in the one SRS resource set, and another SRI indication field is not configured to indicate any SRS resource. Alternatively, if the first indication information indicates the one SRS resource set, and the one SRS resource set includes one SRS resource, the DCI does not include any SRI indication field.

Optionally, if the first indication information indicates one SRS resource set, and the DCI includes the two SRI indication fields, a first SRI indication field in the two SRI indication fields carries an SRI and is configured to indicate the SRS resource in the one SRS resource set, and a second SRI indication field is not configured to indicate any SRS resource.

Optionally, if the first indication information indicates one SRS resource set, and the single-TRP uplink transmission is in the codebook-based uplink transmission mode, the DCI further includes one TPMI indication field, and the one TPMI indication field carries a TPMI corresponding to an SRS resource in the one SRS resource set. Alternatively, if the first indication information indicates the one SRS resource set, and the single-TRP uplink transmission is in the codebook-based uplink transmission mode, the DCI further includes two TPMI indication fields, one TPMI indication field in the two TPMI indication fields carries a TPMI corresponding to an SRS resource in the one SRS resource set, and another TPMI indication field does not correspond to any SRS resource.

Optionally, a first TPMI indication field in the two TPMI indication fields carries the TPMI corresponding to the SRS resource in the one SRS resource set, and a second TPMI indication field does not correspond to any SRS resource.

Optionally, the single-TRP uplink transmission is a codebook-based single-TRP uplink transmission or a non-codebook-based single-TRP uplink transmission. The multi-TRP uplink repeated transmission(s) is a codebook-based multi-TRP uplink repeated transmission(s) or a non-codebook-based multi-TRP uplink repeated transmission(s).

Optionally, the multi-TRP uplink repeated transmissions occupy different time-frequency resources.

Optionally, in some embodiments, the above-mentioned communication unit may be a communication interface or a transceiver, or an input/output interface of a communication chip or a system-on-chip.

It should be understood that the network device 1000 according to some embodiments of this application may correspond to the network device in the method embodiments corresponding to FIG. 4 of this application, and the above-mentioned and other operations and/or functions of each unit in the network device 1000 are for the purpose of realizing the above-mentioned process of the network device in the method embodiments corresponding to FIG. 4, which are not repeated here for brevity.

FIG. 11 shows a schematic block diagram of a network device 1100 according to some embodiments of this application. As shown in FIG. 11, the network device 1100 includes a communication unit 1110 configured to: send an activation instruction to the terminal device, where the terminal device is configured with two SRS resource sets, and the activation instruction is configured to activate one SRS resource set in the two SRS resource sets, thereby indicating to perform a single-TRP uplink transmission through an SRS resource in the one SRS resource set; or the activation instruction is configured to activate the two SRS resource sets, thereby indicating to perform the single-TRP uplink transmission through one SRS resource set in the two SRS resource sets or to perform multi-TRP uplink repeated transmissions through the two SRS resource sets.

Optionally, if the activation instruction is configured to activate two SRS resource sets, the communication unit 1110 is further configured to: send indication information to the terminal device. The indication information is configured to assist in determining whether to perform the single-TRP uplink transmission or the multi-TRP uplink repeated transmissions.

Optionally, the indication information sequentially indicates a first SRS resource set and a second SRS resource set in the two SRS resource sets, or sequentially indicates the second SRS resource set and the first SRS resource set.

Optionally, if the indication information sequentially indicates the first SRS resource set and the second SRS resource set in the two SRS resource sets, or sequentially indicates the second SRS resource set and the first SRS resource set, the indication information is configured to assist in determining to perform the multi-TRP uplink repeated transmissions.

Optionally, the indication information is carried in DCI and occupies 1 bit.

Optionally, the indication information is configured to indicate any of the following:
   indicate a first SRS resource set in the two SRS resource sets;
   indicate a second SRS resource set in the two SRS resource sets;
   sequentially indicate the first SRS resource set and the second SRS resource set;
   sequentially indicate the second SRS resource set and the first SRS resource set.

Optionally, if the indication information indicates the first SRS resource set or the second SRS resource set, the indication information is configured to assist in determining to perform the single-TRP uplink repeated transmission. Alternatively, if the indication information sequentially indicates the first SRS resource set and the second SRS resource set, or sequentially indicates the second SRS resource set and the first SRS resource set, the indication information is configured to assist in determining to perform the multi-TRP uplink repeated transmissions.

Optionally, the indication information is carried in DCI and occupies 2 bits.

Optionally, in some embodiments, the above-mentioned communication unit may be a communication interface or a transceiver, or an input/output interface of a communication chip or a system-on-chip.

It should be understood that the network device 1100 according to some embodiments of this application may correspond to the network device in the method embodiments corresponding to FIG. 7 of this application, and the above-mentioned and other operations and/or functions of each unit in the network device 1100 are for the purpose of realizing the above-mentioned process of the network device in the method embodiments corresponding to FIG. 7, which are not repeated here for brevity.

Figure 12:
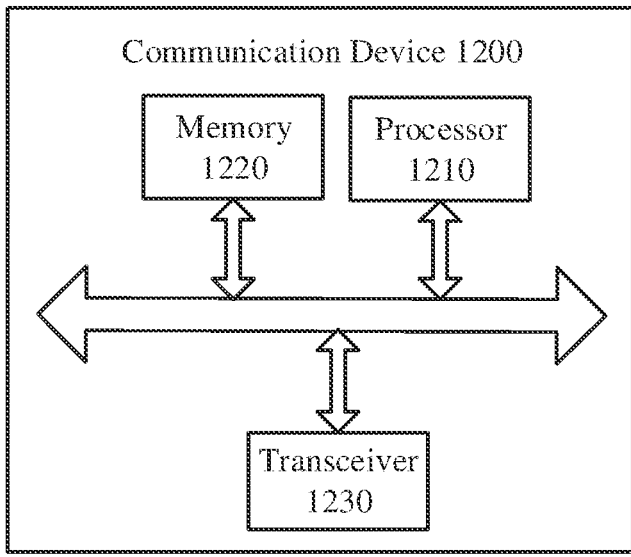
FIG. 12 is a schematic structural diagram of a communication device 1200 according to some embodiments of this application.

FIG. 12 is a schematic structural diagram of a communication device 1200 according to some embodiments of this application. The communication device 1200 shown in FIG. 12 includes a processor 1210, and the processor 1210 may call and run a computer program from a memory to implement the method according to some embodiments of this application.

Optionally, as shown in FIG. 12, the communication device 1200 may further include a memory 1220. The processor 1210 may call and run the computer program from the memory 1220 to implement the method according to some embodiments of this application.

The memory 1220 may be a separate device independent of the processor 1210, or may be integrated in the processor 1210.

Optionally, as shown in FIG. 12, the communication device 1200 may further include a transceiver 1230, and the processor 1210 may control the transceiver 1230 to communicate with other devices, specifically, may send information or data to other devices, or receive information or data sent by other devices.

In some embodiments, the transceiver 1230 may include a transmitter and a receiver. The transceiver 1230 may further include an antenna(s), and the number of the antenna(s) may be one or more.

Optionally, the communication device 1200 may specifically be the network device according to some embodiments of this application, and the communication device 1200 may implement the corresponding processes implemented by the network device in each method according to some embodiments of this application. For brevity, details are not repeated here.

Optionally, the communication device 1200 may specifically be the terminal device according to some embodiments of this application, and the communication device 1200 may implement the corresponding processes implemented by the terminal device in each method according to some embodiments of this application. For brevity, details are not repeated here.

Figure 13:
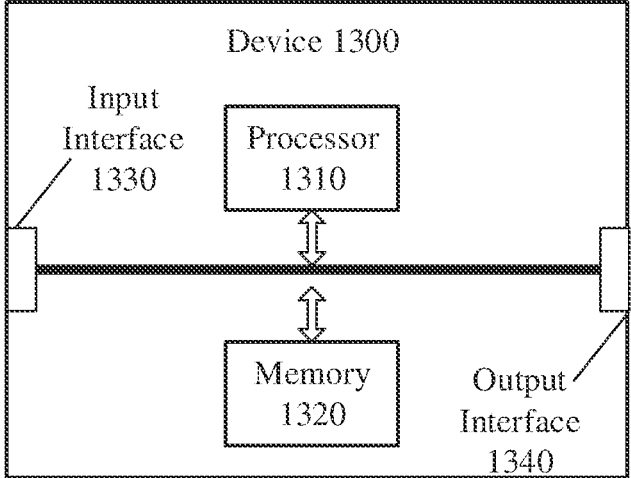
FIG. 13 is a schematic structural diagram of an apparatus according to some embodiments of this application.

FIG. 13 is a schematic structural diagram of an apparatus according to some embodiments of this application. The apparatus 1300 shown in FIG. 13 includes a processor 1310, and the processor 1310 may call and run a computer program from a memory, so as to implement the method according to some embodiments of this application.

Optionally, as shown in FIG. 13, the apparatus 1300 may further include a memory 1320. The processor 1310 may call and run the computer program from the memory 1320 to implement the methods according to some embodiments of this application.

The memory 1320 may be a separate device independent of the processor 1310, or may be integrated in the processor 1310.

Optionally, the apparatus 1300 may further include an input interface 1330. The processor 1310 may control the input interface 1330 to communicate with other devices or chips, and specifically, may obtain information or data sent by other devices or chips.

Optionally, the apparatus 1300 may further include an output interface 1340. The processor 1310 may control the output interface 1340 to communicate with other devices or chips, and specifically, may output information or data to other devices or chips.

Optionally, the apparatus may be applied to the network device according to some embodiments of this application, and the apparatus can implement the corresponding processes implemented by the network device in the various methods according to some embodiments of this application, which are not repeated here for brevity.

Optionally, the apparatus may be applied to the terminal device according to some embodiments of this application, and the apparatus may implement the corresponding processes implemented by the terminal device in various methods according to some embodiments of this application, which are not repeated here for brevity.

Optionally, the apparatus mentioned in some embodiments of this application may also be a chip. For example, it may be a system-level chip, a system chip, a chip system, or a system-on-chip.

Figure 14:
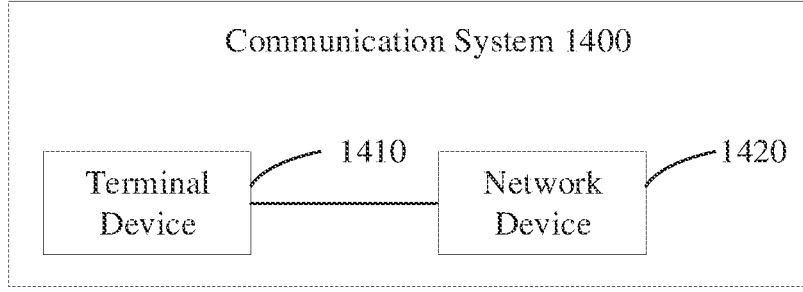
FIG. 14 is a schematic block diagram of a communication system 1400 according to some embodiments of this application.

FIG. 14 is a schematic block diagram of a communication system 1400 according to some embodiments of this application. As shown in FIG. 14, the communication system 1400 includes a terminal device 1410 and a network device 1420.

The terminal device 1410 may be configured to implement the corresponding functions implemented by the terminal device in the above method, and the network device 1420 may be configured to implement the corresponding functions implemented by the network device or the base station in the above method, which are not repeated here for brevity.

It should be understood that the processor in some embodiments of this application may be an integrated circuit chip, which has a signal processing capability. In the implementation process, each step of the above method embodiments may be completed by a hardware integrated logic circuit in a processor or an instruction in the form of software. The above-mentioned processor may be a general-purpose processor, a Digital Signal Processor (DSP), an Application Specific Integrated Circuit (ASIC), a Field Programmable Gate Array (FPGA), or other available programming logic devices, discrete gate or transistor logic devices, discrete hardware components. The methods, steps, and logic block diagrams disclosed in some embodiments of this application may be implemented or executed. The general purpose processor may be a microprocessor or the processor may be any conventional processor or the like. The steps of the method disclosed in conjunction with some embodiments of this application may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage medium known in the art. The storage medium is located in the memory, and the processor reads the information in the memory, and completes the steps of the above method in combination with its hardware.

It should be understood that the memory in some embodiments of this application may be a volatile memory or a non-volatile memory, or may include both volatile and non-volatile memory. In some embodiments, the non-volatile memory may include Read-Only Memory (ROM), Programmable ROM (PROM), Erasable PROM (EPROM), Erasable PROM (EPROM), Electrically EPROM (EEPROM) or flash memory. The volatile memory may include Random Access Memory (RAM), which acts as an external cache. By way of illustration without limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memory of the systems and methods described herein is intended to include, but not be limited to, these and any other suitable types of memory.

It should be understood that the above memory is an example but not a limitative description, for example, the memory in some embodiments of this application may also include static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM) and the like. That is, the memory in some embodiments of this application is intended to include but not limited to these and any other suitable types of memory.

Embodiments of this application further provide a computer-readable storage medium for storing a computer program.

Optionally, the computer-readable storage medium may be applied to the network device or the base station in some embodiments of this application, and the computer program enables the computer to execute the corresponding processes implemented by the network device or the base station in each method according to some embodiments of this application, which will not be repeated here for brevity.

Optionally, the computer-readable storage medium may be applied to the mobile terminal/terminal device in some embodiments of this application, and the computer program enables the computer to execute the corresponding processes implemented by the mobile terminal/terminal device in each method according to some embodiments of this application, which will not be repeated here for brevity.

Embodiments of this application also provide a computer program product, including computer program instructions.

Optionally, the computer program product may be applied to the network device or the base station in some embodiments of this application, and the computer program instructions cause the computer to execute the corresponding processes implemented by the network device or the base station in each method according to some embodiments of this application, which will not be repeated here for brevity.

Optionally, the computer program product may be applied to the mobile terminal/terminal device in some embodiments of this application, and the computer program instructions cause the computer to execute the corresponding processes implemented by the mobile terminal/terminal device in each method according to some embodiments of this application, which will not be repeated here for brevity.

Some embodiments of this application also provide a computer program.

Optionally, the computer program may be applied to the network device or the base station in some embodiments of this application, and when the computer program runs on the computer, the computer can execute the corresponding methods implemented by the network device or the base station in each method according to some embodiments of this application, which will not be repeated here for brevity.

Optionally, the computer program may be applied to the mobile terminal/terminal device in some embodiments of this application, and when the computer program runs on the computer, the computer can execute the corresponding methods implemented by the mobile terminal/terminal device in each method according to some embodiments of this application, which will not be repeated here for brevity.

Those of ordinary skill in the art can realize that the units and algorithm steps of each example described in conjunction with some embodiments disclosed herein may be implemented in electronic hardware, or a combination of computer software and electronic hardware. Whether these functions are performed in hardware or software depends on the specific application and design constraints of the technical solution. Those skilled in the art may implement the described functionality using different methods for each particular application, but such implementations should not be considered beyond the scope of this application.

Those skilled in the art can clearly understand that, for the convenience and brevity of description, the specific working process of the above-described systems, devices and units may refer to the corresponding processes in the foregoing method embodiments, which will not be repeated here.

In the several embodiments provided in this application, it should be understood that the disclosed system, apparatus and method may be implemented in other manners. For example, the apparatus embodiments described above are only illustrative. For example, the division of the units is only a logical function division. In actual implementation, there may be other division manners. For example, multiple units or components may be combined or may be integrated into another system, or some features may be ignored, or not implemented. On the other hand, the shown or discussed mutual coupling or direct coupling or communication connection may be through some interfaces, indirect coupling or communication connection of devices or units, and may be in electrical, mechanical or other forms.

The units described as separate components may be or may not be physically separated, and components displayed as units may be or may not be physical units, that is, may be located in one place, or may be distributed at multiple network units. Some or all of the units may be selected according to actual needs to achieve the purpose of the solution in some embodiments.

In addition, each functional unit in each embodiment of this application may be integrated into one processing unit, or each unit may exist physically alone, or two or more units may be integrated into one unit.

The functions, if implemented in the form of software functional units and sold or used as independent products, may be stored in a computer-readable storage medium. For such understanding, the technical solution of this application in essence, or the part that contributes to the prior art or the part of the technical solution, may be embodied in the form of a software product. The computer software product is stored in a storage medium, including several instructions causing a computer device (which may be a personal computer, a server, or a network device, etc.) to execute all or part of the steps of the methods described in the various embodiments of this application. The aforementioned storage medium includes U disk, mobile hard disk, Read-Only Memory (ROM), Random Access Memory (RAM), magnetic disk or optical disk and other medium that can store program codes.

The above is only a specific implementation of the application, but the protection scope of this application is not limited thereto. Those skilled in the art can easily think of changes or substitutions within the technical scope disclosed in the application, which should fall within the protection scope of this application. Therefore, the protection scope of this application should be based on the protection scope of appended claims.

What is claimed is:

1. A wireless communication method, applied to a terminal device configured with two sounding reference signal (SRS) resource sets, comprising:

receiving downlink control information (DCI), wherein the DCI comprises first indication information; and performing, according to the first indication information, a single-transmission receive point (TRP) uplink transmission or multi-TRP uplink repeated transmissions;

wherein the two SRS resource sets comprises a first SRS resource set and a second SRS resource set, values of the first indication information comprise at least a first value indicating the first SRS resource set, a second value indicating the second SRS resource set, and a third value indicating the first SRS resource set and the second SRS resource set; the first indication information, taking the first or second value, indicates one SRS resource set in the two SRS resource sets, thereby indicating to perform the single-TRP uplink transmission through an SRS resource in the one SRS resource set; and the first indication information, taking the third value, indicates the two SRS resource sets, thereby indicating to perform the multi-TRP uplink repeated transmissions through SRS resources in the two SRS resource sets, wherein, if the first indication information sequentially indicates the first SRS resource set and the second SRS resource set, the first SRS resource set corresponds to an odd-numbered uplink repeated transmission in the multi-TRP uplink repeated transmissions, and the second SRS resource set corresponds to an even-numbered uplink repeated transmission in the multi-TRP uplink repeated transmissions; or, if the first indication information sequentially indicates the second SRS resource set and the first SRS resource set, the second SRS resource set corresponds to the odd-numbered uplink repeated transmission, and the first SRS resource set corresponds to the even-numbered uplink repeated transmission.

2. The method according to claim 1, wherein, if the first indication information indicates the two SRS resource sets, the DCI further comprises two SRI indication fields, and the two SRI indication fields are in one-to-one correspondence with the two SRS resource sets; or, if the first indication information indicates the two SRS resource sets, one SRS resource set in the two SRS resource sets comprises one SRS resource, and another SRS resource set comprises multiple SRS resources, the DCI further comprises one SRI indication field, and the one SRI indication field corresponds to the another SRS resource set; or, if the first indication information indicates the two SRS resource sets, and each of the two SRS resource sets comprises one SRS resource, the DCI does not comprise any SRI indication field.

3. The method according to claim 2, wherein, if the first indication information sequentially indicates the first SRS resource set and the second SRS resource set in the two SRS resource sets, and the DCI comprises the two SRI indication fields, the first SRS resource set corresponds to a first SRI indication field in the two SRI indication fields, and the second SRS resource set corresponds to a second SRI indication field in the two SRI indication fields; or, if the first indication information sequentially indicates the second SRS resource set and the first SRS resource set, the second SRS resource set corresponds to the first SRI indication field, and the first SRS resource set corresponds to the second SRI indication field.

4. The method according to claim 1, wherein, if the first indication information indicates the two SRS resource sets, and the multi-TRP uplink repeated transmissions are in a codebook-based uplink transmission mode, the DCI further comprises two transmission precoding matrix indicator (TPMI) indication fields, and the two TPMI indication fields are in one-to-one correspondence with the two SRS resource sets.

5. The method according to claim 4, wherein, if the first indication information sequentially indicates the first SRS resource set and the second SRS resource set, the first SRS resource set corresponds to a first TPMI indication field in the two TPMI indication fields, and the second SRS resource set corresponds to a second TPMI indication field in the two TPMI indication fields; or, if the first indication information sequentially indicates the second SRS resource set and the first SRS resource set, the second SRS resource set corresponds to the first TPMI indication field, and the first SRS resource set corresponds to the second TPMI indication field.

6. The method according to claim 1, wherein, if the first indication information indicates the one SRS resource set, the DCI further comprises one SRI indication field, and an SRI carried in the one SRI indication field is configured to indicate the SRS resource in the one SRS resource set; or, if the first indication information indicates the one SRS resource set, the DCI further comprises two SRI indication fields, wherein an SRI indication field in the two SRI indication fields carries an SRI and is configured to indicate the SRS resource in the one SRS resource set, and another SRI indication field is not configured to indicate any SRS resource; or, if the first indication information indicates the one SRS resource set, and the one SRS resource set comprises one SRS resource, the DCI does not comprise any SRI indication field.

7. The method according to claim 1, wherein, if the first indication information indicates the one SRS resource set, and the single-TRP uplink transmission is in a codebook-based uplink transmission mode, the DCI further comprises one TPMI indication field, and the one TPMI indication field carries a TPMI corresponding to the SRS resource in the one SRS resource set; or, if the first indication information indicates the one SRS resource set, and the single-TRP uplink transmission is in a codebook-based uplink transmission mode, the DCI further comprises two TPMI indication fields, one TPMI indication field in the two TPMI indication fields carries a TPMI corresponding to the SRS resource in the one SRS resource set, and another TPMI indication field does not correspond to any SRS resource.

8. A terminal device, being configured with two sounding reference signal (SRS) resource sets and comprising:

a transceiver, configured to receive downlink control information (DCI), wherein the DCI comprises first indication information; and a processor, configured to perform, according to the first indication information, a single-transmission receive point (TRP) uplink transmission or multi-TRP uplink repeated transmissions;

wherein the two SRS resource sets comprises a first SRS resource set and a second SRS resource set, values of the first indication information comprise at least a first value indicating the first SRS resource set, a second value indicating the second SRS resource set, and a third value indicating the first SRS resource set and the second SRS resource set; and the first indication information, taking the first or second value, indicates one SRS resource set in the two SRS resource sets, thereby indicating to perform the single-TRP uplink transmission through an SRS resource in the one SRS resource set; and the first indication information, taking the third value, indicates the two SRS resource sets, thereby indicating to perform the multi-TRP uplink repeated transmissions through SRS resources in the two SRS resource sets, wherein, if the first indication information sequentially indicates the first SRS resource set and the second SRS resource set, the first SRS resource set corresponds to an odd-numbered uplink repeated transmission in the multi-TRP uplink repeated transmissions, and the second SRS resource set corresponds to an even-numbered uplink repeated transmission in the multi-TRP uplink repeated transmissions; or, if the first indication information sequentially indicates the second SRS resource set and the first SRS resource set, the second SRS resource set corresponds to the odd-numbered uplink repeated transmission, and the first SRS resource set corresponds to the even-numbered uplink repeated transmission.

9. The terminal device according to claim 8, wherein, if the first indication information indicates the two SRS resource sets, the DCI further comprises two SRI indication fields, and the two SRI indication fields are in one-to-one correspondence with the two SRS resource sets; or, if the first indication information indicates the two SRS resource sets, one SRS resource set in the two SRS resource sets comprises one SRS resource, and another SRS resource set comprises multiple SRS resources, the DCI further comprises one SRI indication field, and the one SRI indication field corresponds to the another SRS resource set; or, if the first indication information indicates the two SRS resource sets, and each of the two SRS resource sets comprises one SRS resource, the DCI does not comprise any SRI indication field.

10. The terminal device according to claim 9, wherein, if the first indication information sequentially indicates the first SRS resource set and the second SRS resource set in the two SRS resource sets, and the DCI comprises the two SRI indication fields, the first SRS resource set corresponds to a first SRI indication field in the two SRI indication fields, and the second SRS resource set corresponds to a second SRI indication field in the two SRI indication fields; or, if the first indication information sequentially indicates the second SRS resource set and the first SRS resource set, the second SRS resource set corresponds to the first SRI indication field, and the first SRS resource set corresponds to the second SRI indication field.

11. The terminal device according to claim 8, wherein, if the first indication information indicates the two SRS resource sets, and the multi-TRP uplink repeated transmissions are in a codebook-based uplink transmission mode, the DCI further comprises two transmission precoding matrix indicator (TPMI) indication fields, and the two TPMI indication fields are in one-to-one correspondence with the two SRS resource sets.

12. A network device, comprising:

a transceiver, configured to send downlink control information (DCI) to a terminal device, wherein the DCI comprises first indication information, and the terminal device is configured with two sounding reference signal (SRS) resource sets;

wherein the two SRS resource sets comprises a first SRS resource set and a second SRS resource set, values of the first indication information comprise at least a first value indicating the first SRS resource set, a second value indicating the second SRS resource set, and a third value indicating the first SRS resource set and the second SRS resource set; and the first indication information, taking the first or second value, indicates one SRS resource set in the two SRS resource sets, thereby indicating to perform a single-transmission receive point (TRP) uplink transmission through an SRS resource in the one SRS resource set; and the first indication information, taking the third value, indicates the two SRS resource sets, thereby indicating to perform multi-TRP uplink repeated transmissions through SRS resources in the two SRS resource sets, wherein, if the first indication information sequentially indicates the first SRS resource set and the second SRS resource set, the first SRS resource set corresponds to an odd-numbered uplink repeated transmission in the multi-TRP uplink repeated transmissions, and the second SRS resource set corresponds to an even-numbered uplink repeated transmission in the multi-TRP uplink repeated transmissions; or, if the first indication information sequentially indicates the second SRS resource set and the first SRS resource set, the second SRS resource set corresponds to the odd-numbered uplink repeated transmission, and the first SRS resource set corresponds to the even-numbered uplink repeated transmission.

13. The network device according to claim 12, wherein, if the first indication information indicates the two SRS resource sets, the DCI further comprises two SRI indication fields, and the two SRI indication fields are in one-to-one correspondence with the two SRS resource sets; or, if the first indication information indicates the two SRS resource sets, one SRS resource set in the two SRS resource sets comprises one SRS resource, and another SRS resource set comprises multiple SRS resources, the DCI further comprises one SRI indication field, and the one SRI indication field corresponds to the another SRS resource set; or, if the first indication information indicates the two SRS resource sets, and each of the two SRS resource sets comprises one SRS resource, the DCI does not comprise any SRI indication field.

14. The network device according to claim 13, wherein, if the first indication information sequentially indicates the first SRS resource set and the second SRS resource set in the two SRS resource sets, and the DCI comprises the two SRI indication fields, the first SRS resource set corresponds to a first SRI indication field in the two SRI indication fields, and the second SRS resource set corresponds to a second SRI indication field in the two SRI indication fields; or, if the first indication information sequentially indicates the second SRS resource set and the first SRS resource set, the second SRS resource set corresponds to the first SRI indication field, and the first SRS resource set corresponds to the second SRI indication field.

15. The network device according to claim 12, wherein, if the first indication information indicates the two SRS resource sets, and the multi-TRP uplink repeated transmissions are in a codebook-based uplink transmission mode, the DCI further comprises two transmission precoding matrix indicator (TPMI) indication fields, and the two TPMI indication fields are in one-to-one correspondence with the two SRS resource sets.

16. The network device according to claim 15, wherein, if the first indication information sequentially indicates the first SRS resource set and the second SRS resource set, the first SRS resource set corresponds to a first TPMI indication field in the two TPMI indication fields, and the second SRS resource set corresponds to a second TPMI indication field in the two TPMI indication fields; or, if the first indication information sequentially indicates the second SRS resource set and the first SRS resource set, the second SRS resource set corresponds to the first TPMI indication field, and the first SRS resource set corresponds to the second TPMI indication field.

17. The network device according to claim 12, wherein, if the first indication information indicates the one SRS resource set, the DCI further comprises one SRI indication field, and an SRI carried in the one SRI indication field is configured to indicate the SRS resource in the one SRS resource set; or, if the first indication information indicates the one SRS resource set, the DCI further comprises two SRI indication fields, wherein an SRI indication field in the two SRI indication fields carries an SRI and is configured to indicate the SRS resource in the one SRS resource set, and another SRI indication field is not configured to indicate any SRS resource; or, if the first indication information indicates the one SRS resource set, and the one SRS resource set comprises one SRS resource, the DCI does not comprise any SRI indication field.

18. The network device according to claim 12, wherein, if the first indication information indicates the one SRS resource set, and the single-TRP uplink transmission is in a codebook-based uplink transmission mode, the DCI further comprises one TPMI indication field, and the one TPMI indication field carries a TPMI corresponding to the SRS resource in the one SRS resource set; or, if the first indication information indicates the one SRS resource set, and the single-TRP uplink transmission is in a codebook-based uplink transmission mode, the DCI further comprises two TPMI indication fields, one TPMI indication field in the two TPMI indication fields carries a TPMI corresponding to the SRS resource in the one SRS resource set, and another TPMI indication field does not correspond to any SRS resource.

\* \* \* \* \*